(12) United States Patent
Gambino et al.

(10) Patent No.: US 6,375,761 B1
(45) Date of Patent: Apr. 23, 2002

(54) MAGNETORESISTIVE MATERIAL WITH TWO METALLIC MAGNETIC PHASES

(75) Inventors: Richard J. Gambino, Stony Brook, NY (US); Taewan Kim, Kyunggi-Do (KR)

(73) Assignee: The Research Foundation of State University of New York, Stony Brook, NY (US)

( * ) Notice: Subject to any disclaimer, the term of this patent is extended or adjusted under 35 U.S.C. 154(b) by 0 days.

(21) Appl. No.: 09/763,420
(22) PCT Filed: Aug. 28, 1998
(86) PCT No.: PCT/US98/17864
   § 371 Date: Apr. 30, 2001
   § 102(e) Date: Apr. 30, 2001
(87) PCT Pub. No.: WO00/13194
   PCT Pub. Date: Mar. 9, 2000
(51) Int. Cl.[7] .................................. H01F 1/053
(52) U.S. Cl. ................ 148/301; 148/120; 148/121; 148/122; 148/360; 148/113
(58) Field of Search ................... 148/300, 301, 148/306, 310, 311, 312, 313, 120, 121, 122; 360/113

(56) References Cited

U.S. PATENT DOCUMENTS

| | | |
|---|---|---|
| 5,041,200 A | 8/1991 | Ishii et al. |
| 5,087,607 A | 2/1992 | Strom et al. |
| 5,213,906 A | 5/1993 | Le Corre et al. |
| 5,783,284 A | 7/1998 | Shinjo et al. |
| 5,793,279 A | 8/1998 | Nepela |

*Primary Examiner*—John Sheehan
(74) *Attorney, Agent, or Firm*—Baker Botts LLP

(57) ABSTRACT

A magnetoresistive material with two metallic magnetic phases. The material exhibits the giant magnetoresistance effect (GMR). A first phase of the material includes a matrix of an electrically conductive ferromagnetic transition metal or an alloy thereof. A second precipitate phase exhibits ferromagnetic behavior when precipitated into the matrix and is antiferromagnetically exchange coupled to the first phase. The second precipitate phase can be electrically conductive rare earth pnictide or can be a Heusler alloy. A method of manufacturing magnetoresistive materials according to the present invention employs facing targets magnetron sputtering. The invention also includes a method of detecting magnetic field strength by providing a read head including a portion of one of the magnetoresistive materials according to the invention, exposing the read head to the magnetic field of a magnetic recording medium, sensing electrical resistivity of the portion of material associated with the magnetic field of the magnetic recording medium, and converting the electrical resistivity into a signal which is indicative of the magnetic field strength of the magnetic field associated with the magnetic recording medium. A digital magnetic recording system, according to the present invention, is adapted for use with a magnetic recording medium having a characteristic coercive force and a plurality of stored bits thereon. The bits are stored by magnetic field strength levels of a magnetic field associated with the medium. The system can include a conventional write head and a controller. The system can also include a read head including a portion of magnetoresistive material according to the present invention which is located in proximity to the medium and a suitable resistivity sensor.

32 Claims, 11 Drawing Sheets

MAGNETORESISTIVE MATERIAL WITH TWO METALLIC MAGNETIC PHASES

BACKGROUND OF THE INVENTION

1. Field of the Invention

The present invention relates to materials for use in magnetic recording sensors and the like, and more particularly relates to a magnetoresistive material with two metallic magnetic phases.

2. Brief Description of the Prior Art

Materials which exhibit a change in resistance when exposed to a magnetic field are of use in preparing magnetic recording sensors, such as those used, for example, in computer disk drives. At the present time, state-of-the-art computer disk drives employ sensor materials which exhibit the anisotropic magnetoresistance effect (AMR). Materials which exhibit the AMR have a magnetoresistance which depends on how the magnetic field is applied with respect to the direction of current flow.

In other types of materials, which exhibit the giant magnetoresistance effect (GMR), a non-magnetic metallic conductor, such as copper, is necessary to create a disordered state of electron spins in a ferromagnet. However, the nonmagnetic metallic conductor does not contribute to desired scattering of the conduction electrons, and in fact, may act as a low resistance shunt path which decreases the magnetoresistance. These prior GMR materials include a magnetic metal and a non-magnetic metal.

Macroscopic ferrimagnets are a new class of phase separated magnetic materials which have been recently discovered, and are described, for example, in R. J. Gambino et al., 75 *J. Appl. Phys.* 1871 (1994). The macroscopic ferrimagnets include two magnetic phases with a negative magnetic exchange at the phase boundary. A prototypical example is the Co—EuS system which has 100 Å particles of EuS in a cobalt matrix. The EuS is exchange coupled antiferromagnetically to the cobalt at least at the Co/EuS interface. In the Co—EuS system, the small size of the EuS particles results in a large fraction of the EuS being in close proximity to the interface which is influenced by the strong Co/EuS exchange. It has been found that these materials display unusual magneto-optical properties, as described in R. J. Gambino and P. Fumagalli, 30 *IEEE Trans. Magn.* 4461 (1994), and magneto-transport properties, as described in R. J. Gambino and J. Wang, 33 *Scr. Metall. Mater.* 1877 (1995) and R. J. Gambino et al., 31 *IEEE Trans. Magn.* 3915 (1995). Magnetization and Kerr hysteresis loops have confirmed the macroscopic ferrimagnetic model for these systems. In measurements of the optical and magneto-optical properties of Co—EuS thin films, polar Kerr rotations of up to 2° have been observed in Co-rich films at photon energies of 4.5 eV, as described in P. Fumagalli et al, 31 *IEEE Trans. Magn.* 3319 (1995). Transport measurements show that the magnetoresistance of Co—EuS behaves like that of the widely studied granular giant magnetoresistance effect (GMR) materials, as described in S. Zhang, 61 *Appl. Phys. Lett.* 1855 (1992), which include particles of a ferromagnetic metal in a conductive, nonmagnetic matrix. In contrast, Co—EuS includes semiconducting, ferromagnetic particles in a conductive, ferromagnetic matrix of cobalt. As a consequence, the temperature dependence of the magnetoresistance is very different in the Co—EuS system as compared to the ordinary granular GMR materials. With respect to the magnitude of the effect, the magnetoresistivity change ($\delta\rho$) of the Co—EuS system is $8\times10^{-5}$ $\Omega$-cm at room temperature in a field of 1T, which is larger than other magnetoresistive materials. Even though the magnetoresistivity change of this system is large, the magnetoresistance defined as $\delta\rho/\rho$ is small, typically 2~3%, because of the high resistivity of the material caused by a large volume fraction of the semiconducting EuS phase.

While materials exhibiting the AMR effect have enhanced the performance of computer disk drives, and while the aforementioned Co—EuS systems are promising, it would be desirable to develop materials having a larger change in resistance as a function of applied magnetic field strength, that is, a larger magnetoresistance effect. Such materials could permit the development of more sensitive magnetic recording sensors. It would be desirable to develop such materials which would exhibit the GMR as opposed to the AMR. In materials exhibiting the GMR, the resistivity decreases with the applied magnetic field independent of the direction of the applied field with respect to the direction of current flow. In addition to this desirable isotropy, the GMR is usually stronger than the AMR.

SUMMARY OF THE INVENTION

It is an object of the present invention to provide an improved material suitable for manufacturing more sensitive magnetic recording sensors.

It is another object of the present invention to provide such a material which exhibits the GMR.

It is a further object of the present invention to provide such a material which includes two ferromagnetic phases which are exchange coupled antiferromagnetically.

It is yet another object of the present invention to provide a method of manufacturing such a material.

It is a further object of the present invention to provide a method of sensing magnetic fields using such a material.

It is still another object of the present invention to provide a digital magnetic recording system which utilizes such a material in a read head.

In accordance with one form of the material of the present invention, a magnetoresistive material exhibits the GMR and has two phases. The first phase includes a matrix of an electrically conductive ferromagnetic transition metal or an alloy thereof. The second phase is a precipitate phase of an electrically conductive rare earth pnictide which exhibits ferromagnetic behavior when precipitated out of the matrix. The second phase is antiferromagnetically exchange coupled to the first phase. In a preferred form of the first embodiment, the matrix comprises cobalt and the precipitate phase comprises terbium nitride.

Thus, the present invention provides a new macroscopic ferrimagnet, in the system Co—TbN, which exhibits the GMR. The Co—TbN system demonstrates typical macroscopic ferrimagnet properties: a magnetic compensation point and negative GMR. The Co—TbN system with 32% TbN by volume composition shows 0.72% GMR under an applied field of 8 kOe at room temperature and 9% GMR at 250° K under an applied field of 40 kOe. In the Co—TbN system, the temperature dependence of the GMR is quite different from that of ordinary GMR materials, where the negative magnetoresistance decreases with increasing temperature. The GMR in the Co—TbN system increases with increasing temperature, which is due to the increase of ferromagnetic alignment of the Co and TbN with an applied field caused by the decrease of exchange coupling by temperature.

In an alternative form of material according to the present invention, the second precipitate phase comprises an electrically conductive Heusler alloy such as $Co_2MnSn$ or $Co_2TiSn$.

The present invention also provides a method of manufacturing a magnetoresistive material of the types described above. The method includes the steps of providing a target (for example, a sheet metal or thin film target) of an electrically conductive ferromagnetic transition metal or an alloy thereof; locating a plurality of pellets of an electrically conductive rare earth element (or constituents of a Heusler alloy) on a surface of the target; sputtering the target and the pellets with ions in a suitable plasma, such as an argon plasma, to cause the film and the pellets to form an amorphous alloy of the electrically conductive ferromagnetic transition metal or alloy thereof, and the electrically conductive rare earth element (or constituents of a Heusler alloy); and subsequently annealing the amorphous alloy to cause formation of the precipitate phase within the matrix of the ferromagnetic transition metal or alloy thereof. Techniques other than sputtering can also be employed.

The present invention further provides a method of detecting magnetic field strength of a magnetic field associated with a magnetization pattern recorded in a medium. The method includes the steps of providing a sensing head which includes a portion of a magnetoresistive material of the type described above; exposing the sensing head to the magnetic field of the magnetization pattern in the magnetic recording medium; sensing the electrical resistivity of the portion of magnetoresistive material exposed to the magnetic field of the magnetization pattern in the medium; and converting the electrical resistivity of the portion into a signal which is indicative of the magnetic field strength of the magnetization pattern in the medium. It will be appreciated that any of the materials of the present invention described above can be used for the portion of magnetoresistive material in the read head.

The present invention yet further provides a magnetic recording system which is adapted for use with a magnetic recording medium having a characteristic coercive force and which has a plurality of stored data in it. The data is stored in the form of a magnetization pattern in the medium. The magnetic recording system includes a write head (which is optional) and a read head. The read head includes a portion of the magnetoresistive material of the present invention which is located in proximity to the magnetic recording medium and also includes a resistivity sensor which detects the resistivity of the portion of material according to the present invention corresponding to magnetic field strength levels of the magnetization pattern in the medium. The system also includes a controller which controls the read head (and optional write head) and which converts the detected resistivity of the portion of material according to the present invention into a signal which is indicative of the stored data in the recording medium. Again, the portion of material can be any of the magnetoresistive materials according to the present invention.

These and other features and advantages of the present invention will be pointed out in the following specification, taken in connection with the accompanying drawings, and the scope of the invention will be set forth in the appended claims.

DETAILED DESCRIPTION OF THE INVENTION

Figure 1:
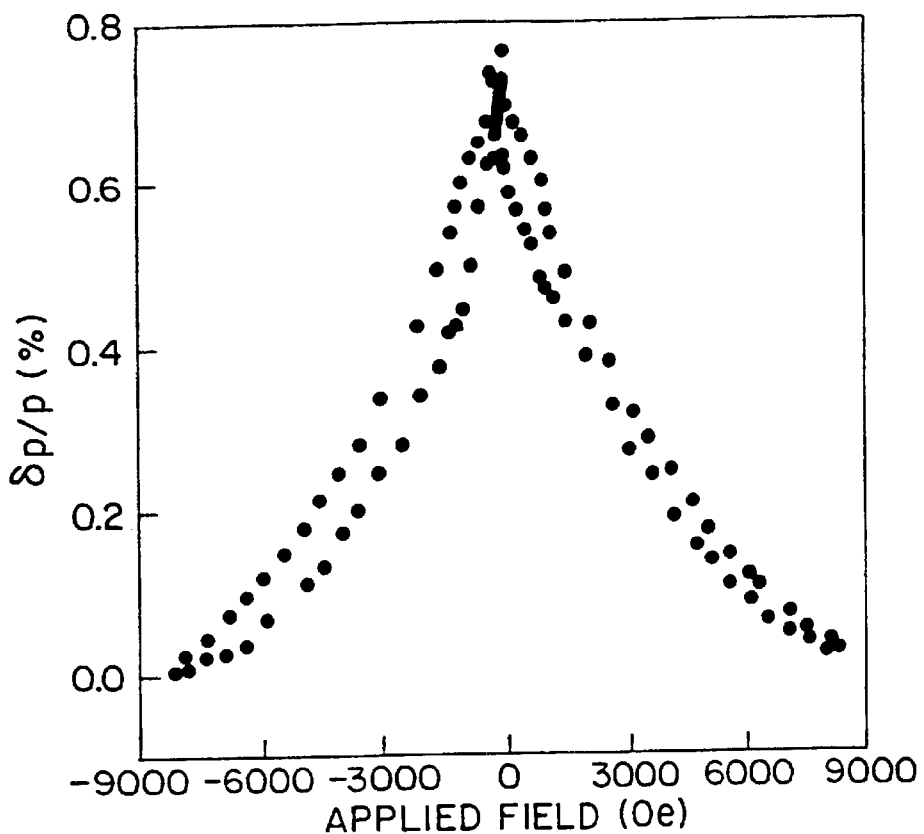
FIG. 1 is a plot of percent change in resistivity (GMR) against applied magnetic field at room temperature for a $Co_{0.68}$—$(TbN)_{0.32}$ material according to the present invention.

One form of material in accordance with the present invention is a magnetoresistive material exhibiting the giant magnetoresistance effect (GMR) and which has two phases. The first phase comprises a matrix of an electrically conductive ferromagnetic transition metal or an alloy thereof. The second phase is a precipitate phase of an electrically conductive rare earth pnictide which exhibits ferromagnetic behavior when precipitated out of the matrix. The second phase is antiferromagnetically exchange coupled to the first phase.

The electrically conductive ferromagnetic transition metal or alloy thereof can include at least one of iron, cobalt and nickel or an alloy of one or more of those elements, such as FeCo, FeNi, NiCo, CoNiFe, NiCu, FeCr, CoAl, and the like. The alloys can be formed from the ferromagnetic metal and non-magnetic materials (e.g., the NiCu, FeCr, and CoAl). Ferromagnetic manganese and chromium compounds can also be employed. The rare earth pnictide can include a rare earth element (or a compound or alloy) thereof, selected to anti-parallel couple to the transition metal or alloy thereof, and (in turn) compounded with one of nitrogen, phosphorous, arsenic, antimony and bismuth. Terbium is presently believed to be the preferred rare earth element.

The precipitate phase may exhibit independent ferromagnetic behavior, that is, it may behave ferromagnetically by itself. Alternatively, the precipitate phase may not show any meaningful independent ferromagnetic behavior, but may become ferromagnetic, that is, may exhibit meaningful ferromagnetic behavior, when it is precipitated into the matrix. In this latter case, the exchange coupling between the phases will boost the ferromagnetism in the small particles of the precipitate phase.

In a preferred material according to the present invention, the matrix comprises cobalt, and the precipitate phase comprises terbium nitride. The terbium nitride should be present in a volume percent which is sufficient to produce the GMR in the material without causing undesirable discontinuities in the cobalt matrix. That is to say, the cobalt should be substantially continuous throughout the device: there should not be cobalt regions surrounded by TbN. The cobalt matrix can have a volume percent of from about, for example, 30% to about 75%. The terbium nitride precipitate phase can have a volume percent of from about 25% to about 70%. As presently understood, it is believed that at about 70% terbium nitride, the cobalt matrix would begin to have the aforementioned undesirable discontinuities.

Preferably, the cobalt matrix has a volume percent of from about 61% to about 70%, and the terbium nitride precipitate phase has a volume percent of from about 30% to about 39%. As discussed below, tests were conducted from about 31 volume percent to about 39 volume percent of terbium nitride and indicated that the GMR continued to increase with increasing volume percentage of terbium nitride. However, the rate of increase appeared to lower between about 35% and about 39% volume percent of terbium nitride.

The Co—TbN system is a macroscopic ferrimagnet and has TbN precipitates in a Co matrix. The TbN has the same magnetic moment as pure Tb and the rock salt structure, as described in R. J. Gambino and J. J. Cuomo, 113 *J. Electrochem. Soc.* 401 (1966), the same as EuS. The TbN precipitates also provide the higher Curie temperature and thus stronger antiparallel exchange coupling with the Co matrix than EuS. These stronger exchange effects are caused by conduction electron mediated exchange of the RKKY type, as described in C. Kittlel, *Introduction to Solid State Physics* 628 (7$^{th}$ Ed., John Wiley and Sons, 1996), which is weak in semiconducting EuS. Another difference is the single ion anisotropy of the Tb ion which is a non-S-state ion. In contrast, EuS contains divalent europium which is a S-state ion and thus has zero single ion anisotropy. Furthermore, the TbN is a conductor rather than semiconductor so the resistivity of Co—TbN is much less than that of Co—EuS, which can improve the magnetoresistance, $\delta\rho/\rho$. The Co—TbN differs with the granular GMR materials in that both phases are magnetic and also differs from the Co—EuS in that both phases are conductors.

In an alternative type of material according to the present invention, the first phase is substantially similar to the first phase discussed above, and the second precipitate phase can include an electrically conductive Heusler alloy which exhibits ferromagnetic behavior when precipitated out of the matrix. Again, the second phase is antiferromagnetically exchange coupled to the first phase. In both cases, a preferred material for the matrix is cobalt. The precipitate phase can be, for example, $Co_2MnSn$ or $Co_2TiSn$. Compositions in the range of 16.7 to 50 mole percent $Co_2MnSn$ in a Co matrix and 16.7 to 50 mole percent $Co_2TiSn$ in a Co matrix have been tested. In both systems, the 50 mole percent compositions are currently believed to be preferable. The mole % is determined by dividing the number of moles of $Co_2MnSn$ or $Co_2TiSn$ by the total number of moles and multiplying by 100. For example, $Co_3MnSn=Co/Co_2MnSn=$ 50 mole % $Co_2MnSn$ and $Co_7MnSn=5Co/Co_2MnSn=16.7$ mole % $Co_2MnSn$. Other operable ranges of the components, exhibiting desirable GMR properties, which can be easily ascertained by one skilled in the art, are within the scope of the invention. The aforementioned discontinuities in the cobalt matrix should be avoided in the Heusler alloy systems as well.

Reference should now be had to FIG. 1 which plots the GMR against applied magnetic field strength for a film made of a material according to the present invention which includes 68 volume percent cobalt and 32 volume percent terbium nitride. The horizontal axis is the applied magnetic field strength H, in oersteds, while the vertical axis shows the GMR as measured by the change in resistivity divided by the resistivity in the saturated state, $\rho(H_{sat})$, expressed as a percent. More specifically:

$$GMR = \delta\rho/\rho = [\rho(0) - \rho(H_{sat})]/\rho(H_{sat}), \qquad (1)$$

where $\rho(0)$ and $\rho(H_{sat})$ are the resistivities in zero field and in a saturating magnetic field, respectively.

Figure 2:
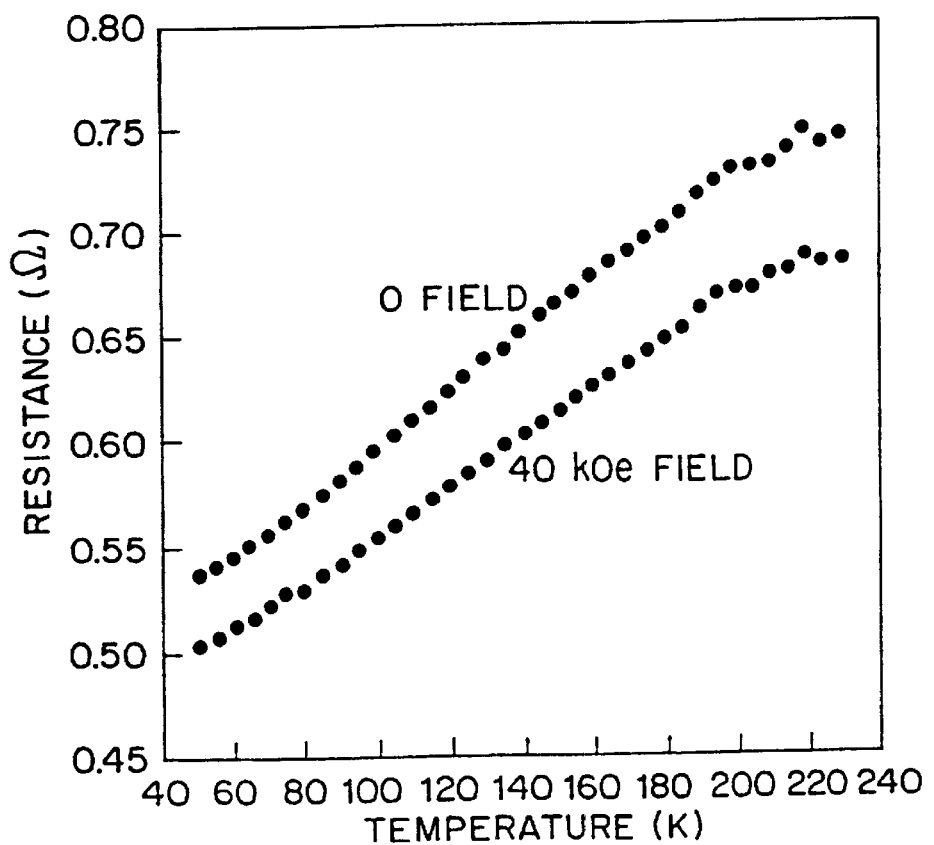
FIG. 2 is a graph of resistance versus temperature at two different values of applied magnetic field strength for the material of FIG. 1.

FIG. 2 shows a plot of the resistance of a sample of the same material as FIG. 1, measured in ohms, as a function of temperature measured in degrees Kelvin with an applied field of H=40 kOe and with an applied field of H=0. In determining the GMR, using the equation $R=\rho L/A$ where R=resistance, $\rho$=resistivity, L=length, and A=cross sectional area, $\Delta R/R = \Delta\rho/\rho$ for a given geometry.

Figure 3:
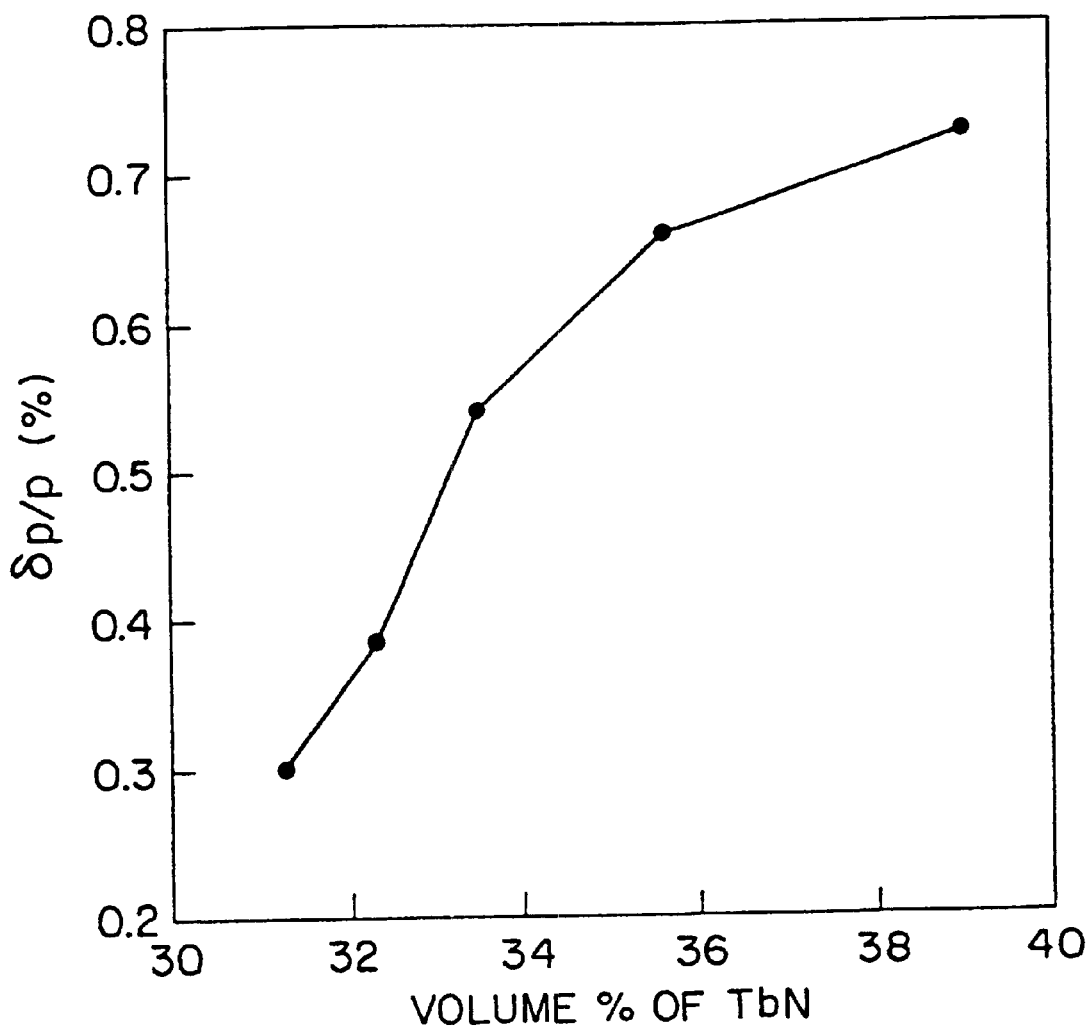
FIG. 3 is a plot of percent change in resistivity (GMR) vs. the volume percent of terbium nitride present in a sample.

FIG. 3 is a plot of the GMR, again expressed as a percent change in resistivity, against the volume percent of terbium nitride in the cobalt-terbium nitride material. As can be seen, the GMR continues to increase with increasing volume percentage of terbium nitride but the rate of change of the increase is less at the higher volume percentages of terbium nitride, that is, about 35–39 volume percent of terbium nitride.

Figure 4:
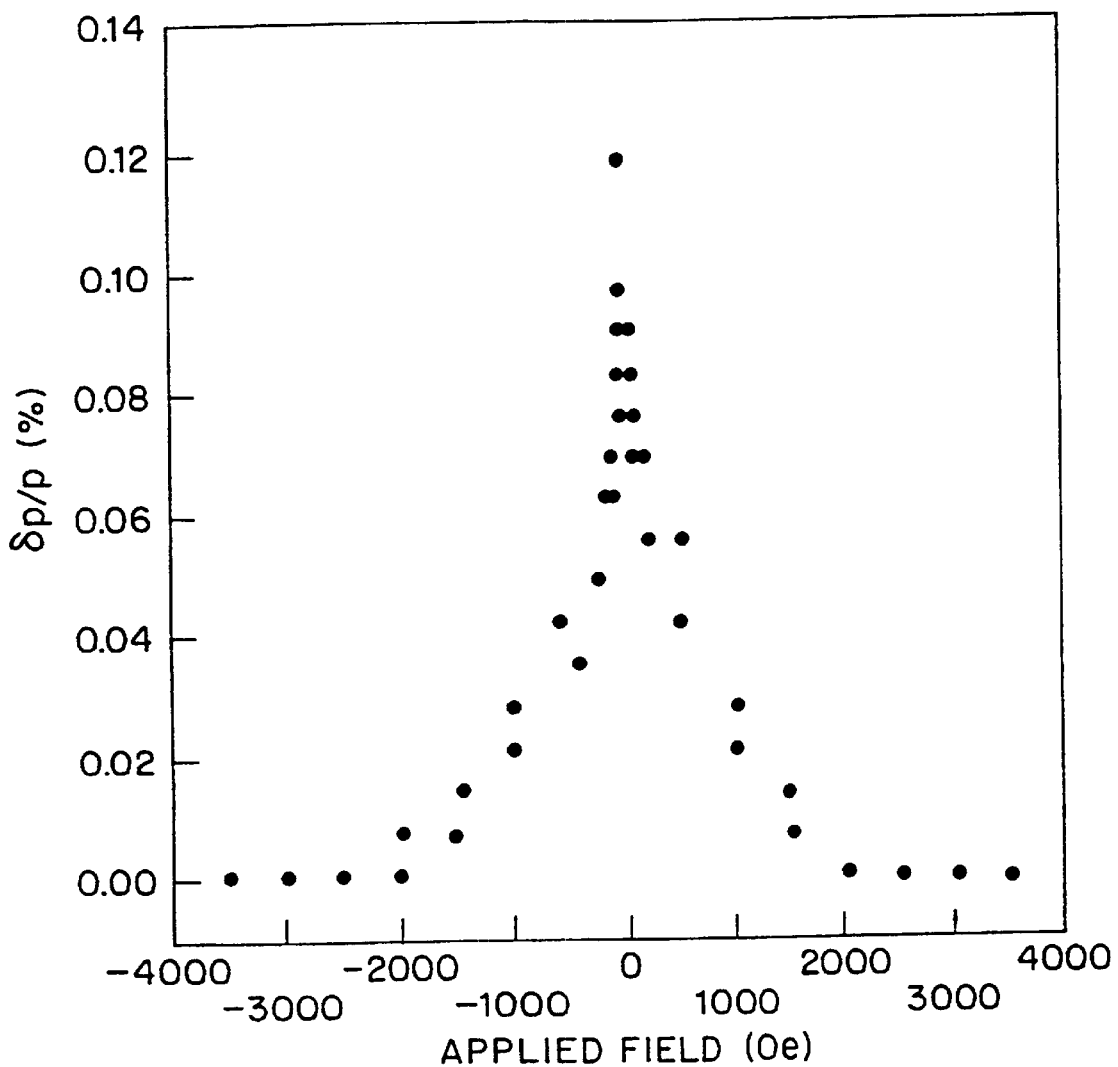
FIG. 4 is a plot of percent change in resistivity (GMR) vs. applied magnetic field at room temperature for a system employing a $Co/Co_2TiSn$ thin film annealed in a vacuum.
Figure 5:
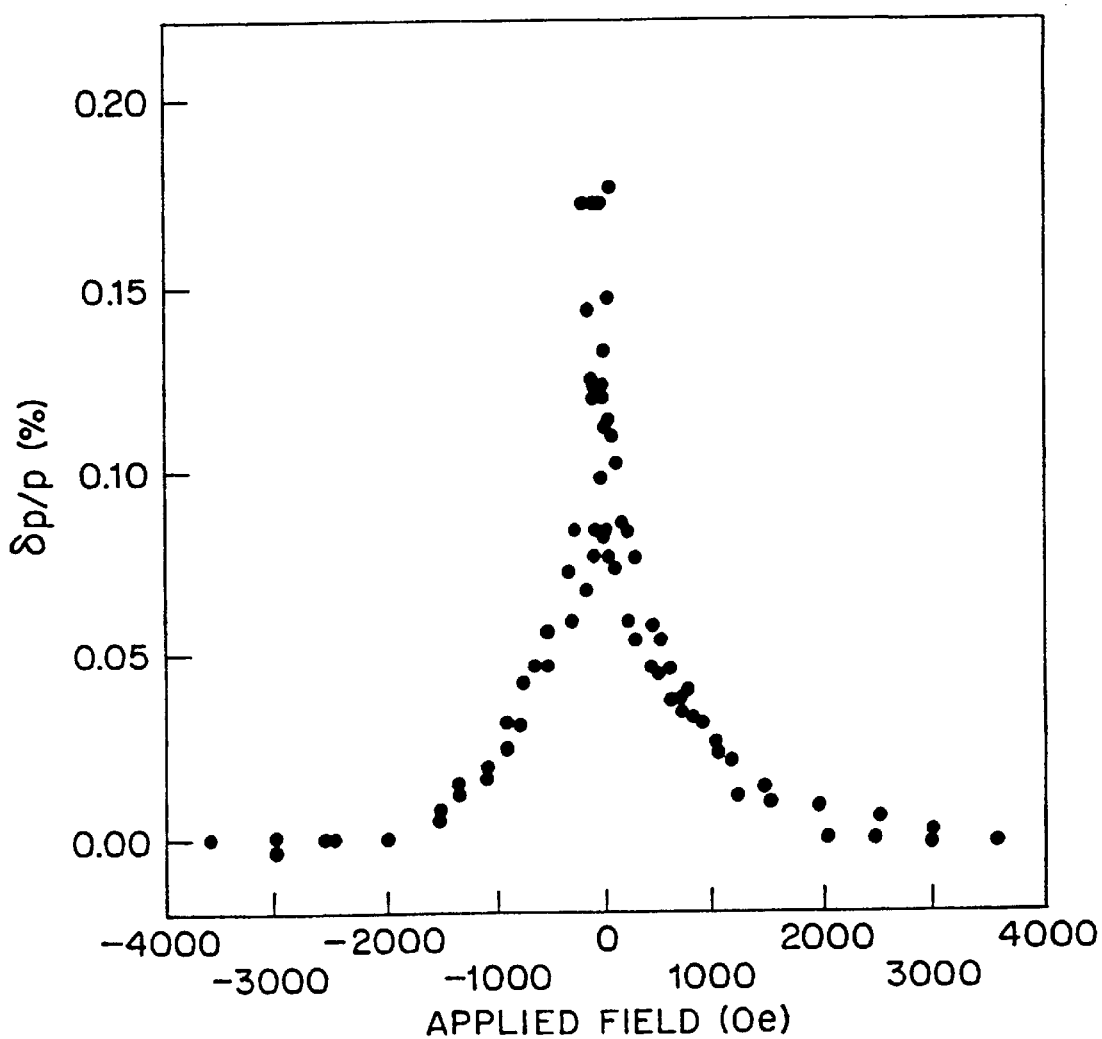
FIG. 5 is a figure similar to FIG. 4 except showing results for the material when annealed in nitrogen.

FIG. 4 shows a plot of GMR, again as a percent change in resistivity, versus the applied fields in oersteds for a $Co/Co_2TiSn$ thin film annealed in vacuum. The plot is in the form of a series of points. FIG. 5 is a similar plot but wherein the thin film has been annealed in nitrogen gas. It can be seen that the GMR increases significantly when the annealing is performed in the nitrogen gas. Similar results are expected for the materials employing Heusler alloys.

The materials described above are macroscopic ferrimagnets which comprise two ferromagnetic phases which are antiferromagnetically exchange coupled. Both of the ferromagnetic phases are metallic conductors. The electrical resistivity of the materials decreases when a magnetic field is applied, and the change in electrical resistance is independent of the direction of the magnetic field with respect to the direction of the current flow. As noted, this type of behavior is characteristic of the giant magnetoresistance effect (GMR) which has previously only been observed in metallic materials comprising a ferromagnetic metal such as cobalt and a nonferromagnetic metal such as copper. The giant magnetoresistance depends on scattering of conduction electrons by spins in a ferromagnet in a disordered state. The prior art materials employed a nonmagnetic metallic conductor such as copper which was necessary to create the disordered state but which did not contribute to the scattering. As noted, depending on the geometry, the copper conductors might in fact act as low resistance shunt paths which decrease the magnetoresistance. In the materials of the present invention, spin scattering can occur in both ferromagnetic phases so that larger GMR effects are possible, in turn enabling more sensitive magnetic recording sensors.

The GMR effect for an exemplary composition is about 8% at room temperature in a field of 4 teslas and it increases slightly with decreasing temperature down to 20 degrees kelvin. FIG. 2 shows data from about 40° K to about 240° K for H=0 and H=40 kOe. It will be appreciated that, in c.g.s. units, $B=H+4\pi M_s$, where B=magnetic flux density in kilogauss, H=magnetic field strength in kilooersteds and $M_s$= magnetization in kilogaus. Outside a ferromagnet, B in kilogauss is normally equal to H in kilooersteds and thus 40 kOe implies 40 kilogauss=4T.

Figure 6:
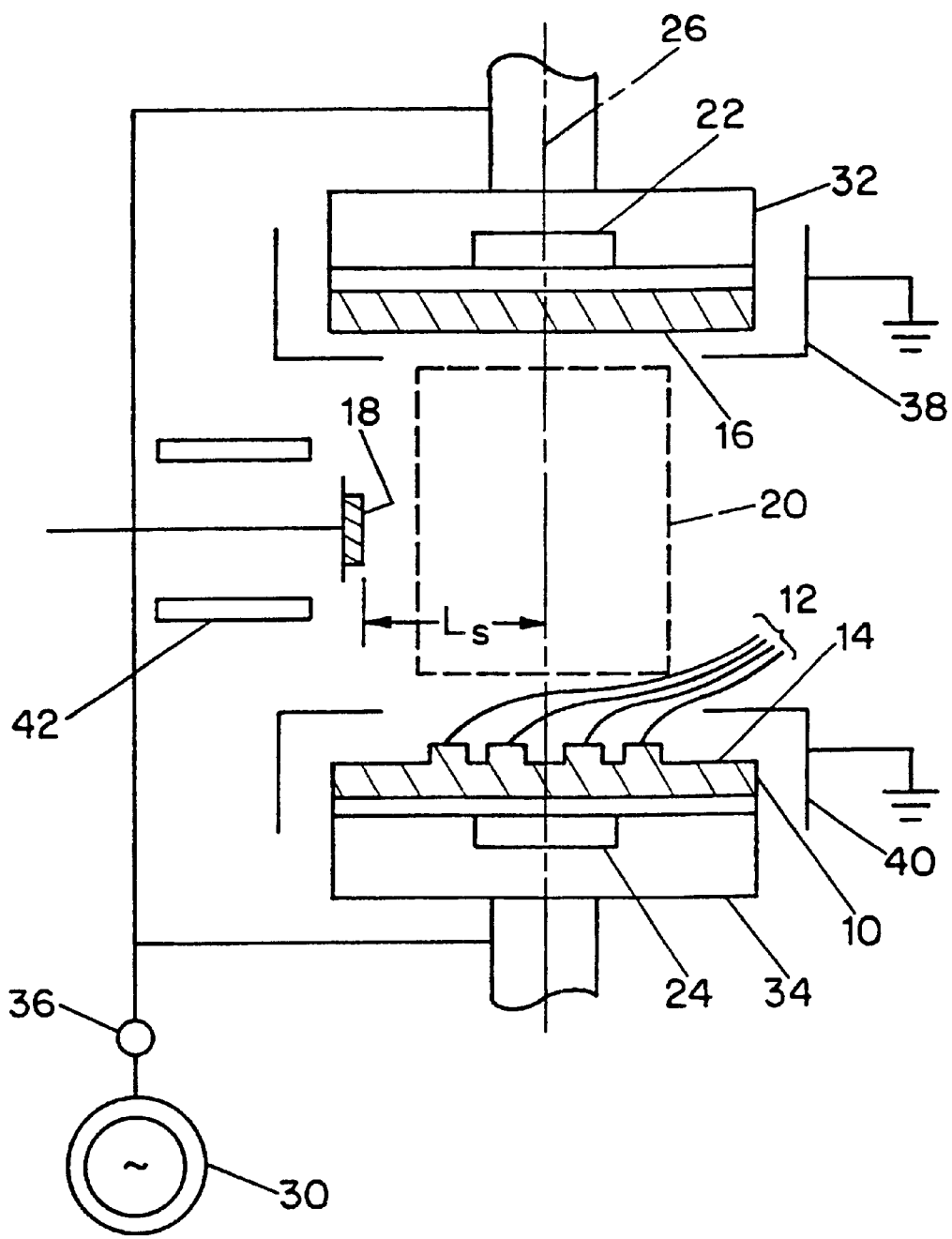
FIG. 6 is a schematic diagram of a facing targets magnetron sputtering system suitable for producing materials in accordance with the present invention.

Methods of manufacturing the materials of the present invention will now be described. The magnitude of the GMR and the field sensitivity of the materials can be controlled by post-deposition heat treatment as set forth below in the Example. Reference is now made to FIG. 6, which depicts a representative sputtering apparatus, to be used in accordance with the present invention, designated generally as 8. A method of manufacturing a magnetoresistive material exhibiting the giant magnetoresistance effect (GMR) and having two phases, in accordance with the present invention, includes the step of providing a suitable target (e.g., sheet metal, a disk, sheet, or plate) of an electrically conductive ferromagnetic transition metal or an alloy thereof. The target is designated as item 10 in FIG. 6. The method includes the additional step of locating a plurality of pellets 12 of an electrically conductive rare earth element on a surface 14 of the target 10. In a preferred form of the present invention, a second target 16 (which can also be, e.g., a disk, sheet, or plate), also of an electrically conductive ferromagnetic transition metal or alloy thereof, is employed. The process illustrated in FIG. 6 is known as facing target magnetron sputtering (FTMS) with a composite target. The second target can initially be a pure conductive ferromagnetic transition metal or alloy thereof without any pellets and unalloyed with the rare earth element. FTMS with pellets on both targets (i.e., both targets are composite targets) is known in the art, as described in Naoe et al., 23 *IEEE, Trans. Magn.* 3429 (1987).

The method also includes sputtering the target 10 (and target 16, when present) and the pellets 12 so as to cause the targets 10 and 16 and the pellets 14 to form an amorphous alloy on substrate 18. The sputtering can be performed using a suitable plasma of a noble gas such as argon (preferred), helium or krypton in a plasma region 20.

Other physical vapor deposition (PVD) techniques can be employed besides sputtering, for example, co-evaporation or ion beam deposition. Sputtering is believed to be preferable. Further, chemical vapor deposition (CVD) can also be performed. Using gases of organometallic precursors of Co and Tb and decomposing them to deposit the metals.

The method can also include the step of annealing the amorphous alloy in an atmosphere containing nitrogen to form a nitride. Other gases such as phosphine, $PH_3$, or arsine, $AsH_3$, are used to form phosphides or arsenides, respectively. Gaseous vapors of the elements P, As, Sb or Bi can also be used. It is desirable to exclude oxygen and have a slightly reducing atmosphere. The nitrogen family element is used to bond with the rare earth element in the amorphous alloy and thus form a precipitate phase of a rare earth pnictide within a matrix of the ferromagnetic transition metal or alloy thereof. One suitable atmosphere (for nitride formation) in which the annealing can be carried out is so-called forming gas which is a mixture of 90% nitrogen and 10% hydrogen by volume. It should be appreciated that any suitable gas containing nitrogen or any other element selected from column VA of the Chemical Abstracts Service (CAS) version of the periodic table, or a compound thereof, can be employed. The annealing time required varies with the temperature and in general will be less at higher temperatures. For example, for nitrogen, 10–12 hours at 650° C. is sufficient. At 450° C., a detectable reaction occurs in 12 hours but is not complete.

Still with reference to FIG. 6, the illustrated apparatus 8 can also include first and second magnets 22, 24. The density of the plasma in the plasma region 20 is enhanced by the presence of the magnetic field induced by magnets 22, 24. The dotted line 26 represents a common axis for the magnets 22, 24.

Figure 7A:
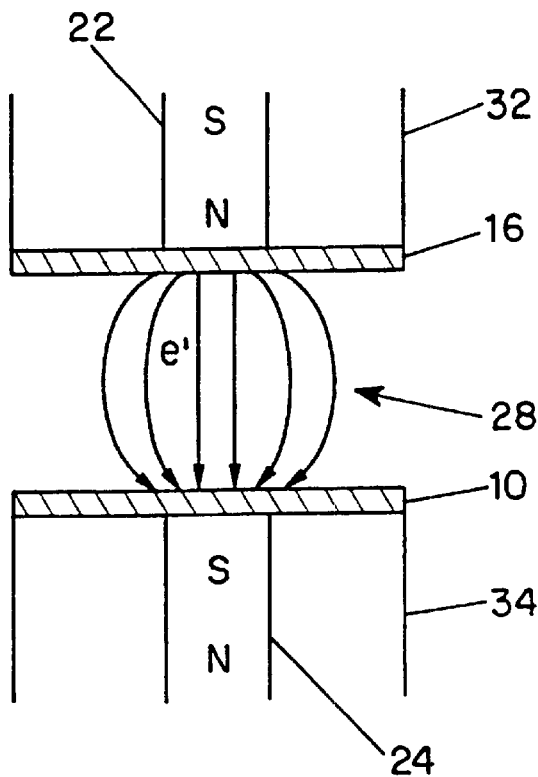
FIG. 7A is a diagram showing a uniform magnetic field in the system of FIG. 6.
Figure 7B:
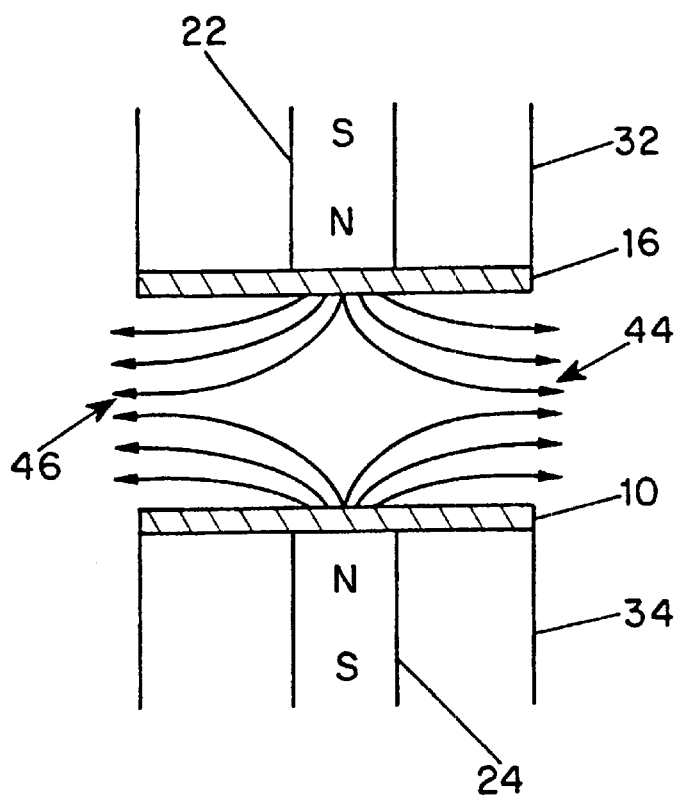
FIG. 7B is a diagram showing a divergent magnetic field in the system of FIG. 6.

Reference should now be had to FIGS. 7A and 7B which depict close-up views of the magnets 22, 24 with certain other elements of the apparatus 8 omitted for clarity. In FIG. 7A, a configuration is shown wherein opposite magnetic poles of magnets 22, 24 face each other. For example, a north pole of magnet 22 is shown facing a south pole of magnet 24. The magnetic field produced by magnets 22, 24 in the configuration shown in FIG. 7A is represented by lines of force 28. In the case shown in FIG. 7A, the plasma density in the plasma region 20 is enhanced by the magnetic field produced by magnets 22, 24. The field is axial from top to bottom, generally along axis 26. The field helps to confine the electrons produced during the sputtering process to the plasma region 20. These electrons collide with the atoms of the gas which forms the plasma, for example argon, to form additional ions, for example argon ions. This process is known as electron collision ionization.

As is known in the sputtering art, the ions hit the targets 10, 16 and cause the emission of atoms as well as secondary electrons. In order to maximize yield, it is undesirable that the secondary electrons hit a surface at a large negative potential. Accordingly, it is desirable to expose the secondary electrons to both a confining magnetic field as shown in FIG. 7A and to a suitable electric field. As is well known, electrons exposed to electric and magnetic fields move in spiral paths between collisions. Referring back to FIG. 6, a suitable electric field can be applied from a radio frequency (RF) supply 30 connected to target holders 32, 34 through a suitable matching network 36. RF supply 30 can have any appropriate power level and frequency known to those skilled in the plasma sputtering art. For example, a power of approximately 2 kW can be employed. In the United States, a frequency of 13.56 MHZ, as allocated by the government for scientific experimentation, can be employed.

Referring back now to FIG. 7A, the magnetic field produced by magnets 22, 24 also serves to confine the plasma to a more limited plasma region 20 which results in more frequent collisions between electrons and neutral gas atoms, a more intense plasma, and generation of more ions for bombardment of the targets. This in turn leads to a higher deposition rate for the material on substrate 18.

Note that the apparatus 8 can include first and second ground shields 38, 40, as known in the sputtering art for purposes of preventing bombardment of the fixtures. Further, a suitable load lock chamber 42 can be employed. Rare earth elements oxidize easily. Although the oxidation could be removed by sputtering, the removed oxide would then tend to deposit on the substrate 18, which would be undesirable. Load lock 42 can be employed to minimize or eliminate oxygen contamination. The substrate 18 is placed into the load lock, the load lock is then evacuated and then the load lock is connected to the main chamber which contains the plasma region 20.

Under certain conditions, it may be desirable to bombard the substrate 18 where the desired film is formed. In conventional processes, a bias voltage can be applied to the substrate. This need not be done with the present invention. A self bias, due to the plasma potential, accelerates positive ions towards all surfaces at ground potential.

In the present invention, bombardment of substrate 18 can be controlled by adjusting the distance $L_s$ between the magnet center line axis 26 and the substrate 18. Different properties are produced in the finished product depending on whether or not the substrate 18 is itself bombarded. The composition, magnetic anisotropy, density and electrical resistivity can be controlled by ion bombardment of the substrate during deposition of the material. Refer to the discussion of FIGS. 8 and 9 below.

As was stated above, target 10 is employed together with pellets 12, while second target 16, when employed, is normally formed only of the electrically conductive ferromagnetic transition metal. However, in the facing target magnetron sputtering process depicted in FIG. 6, since targets 10 and 16 face each other, there will be a target-to-target interchange. Accordingly, the rare earth element, even though initially only on the bottom target 10, will eventually achieve some steady-state level in both targets due to inter-target exchange.

Throughout this discussion, it should be noted that the electrically conductive ferromagnetic transition metal or alloy thereof can be any of the metals or alloys discussed above, including, for example, cobalt. Further, the rare earth element can be, for example, terbium, or any other suitable rare earth element.

Referring again now to FIGS. 7A and 7B, the magnet configuration shown in FIG. 7A is conventional in facing target magnetron sputtering. It is believed that this configuration is preferred for production since it will result in a relatively high deposition rate. FIG. 7B shows an alternative configuration for the magnets 22, 24. In this case, like poles (illustrated as both north poles, but alternatively could be both south poles) face each other. This configuration has the undesirable effect of allowing secondary electrons to escape from the plasma region, thus lowering the deposition rate. However, it can be used to induce perpendicular anisotropy. This is because the growing film on the substrate 18 would be bombarded due to the divergence in the secondary electron paths caused by the alternative lines of magnetic force 44 as shown in FIG. 7B. Thus, it will be appreciated that the secondary electrons in FIG. 7A describe a confined path, while those in FIG. 7B are not confined and would tend to follow a path as designated by arrow 46.

The sputtering process just described can be performed so as to yield the amorphous alloy having a composition of from about 10 atomic % terbium to about 50 atomic % terbium, with the balance comprising cobalt, for example. The parameters to produce desired percentages of the rare earth element and the ferromagnetic transition metal will be discussed further with respect to FIG. 10 below.

The aforementioned method for manufacturing the materials containing the rare earth element can also be adapted to manufacture the materials containing the Heusler alloys. For example, Co, Mn and Sn or Co, Ti and Sn can be co-sputtered and then annealed to precipitate $Co_2MnSn$ or $Co_2TiSn$ respectively. The annealing or heat treating step can be performed, for example, in vacuum or an inert atmosphere (e.g., flowing argon) and the like. The forming gas annealing atmospheres mentioned for the rare earth containing materials can be employed. Throughout this application, for both the rare-earth-containing embodiments and the Heusler alloy embodiments, it is to be understood that "precipitated out" generally refers to the precipitation, out of an alloy, of the second phase referred to, as described throughout the application.

Other methods of forming precipitates are also within the scope of the application. For example, rapid liquid quenching could be employed to form an amorphous ribbon, wherein a molten mixture is cooled at a very high rate, for example, about $10^6$ C/sec for example, by impinging on a water cooled copper surface or wheel. Subsequent annealing is then required to from the precipitate. Further, the aforementioned vapor deposition techniques can include decomposition of carbonyl compounds such as $Fe(CO)_5$ to metals. A suitable mixture of metal carbonyl can be decomposed to form an amorphous alloy which precipitates a magnetic phase out of a magnetic metallic matrix by annealing.

Figure 8:
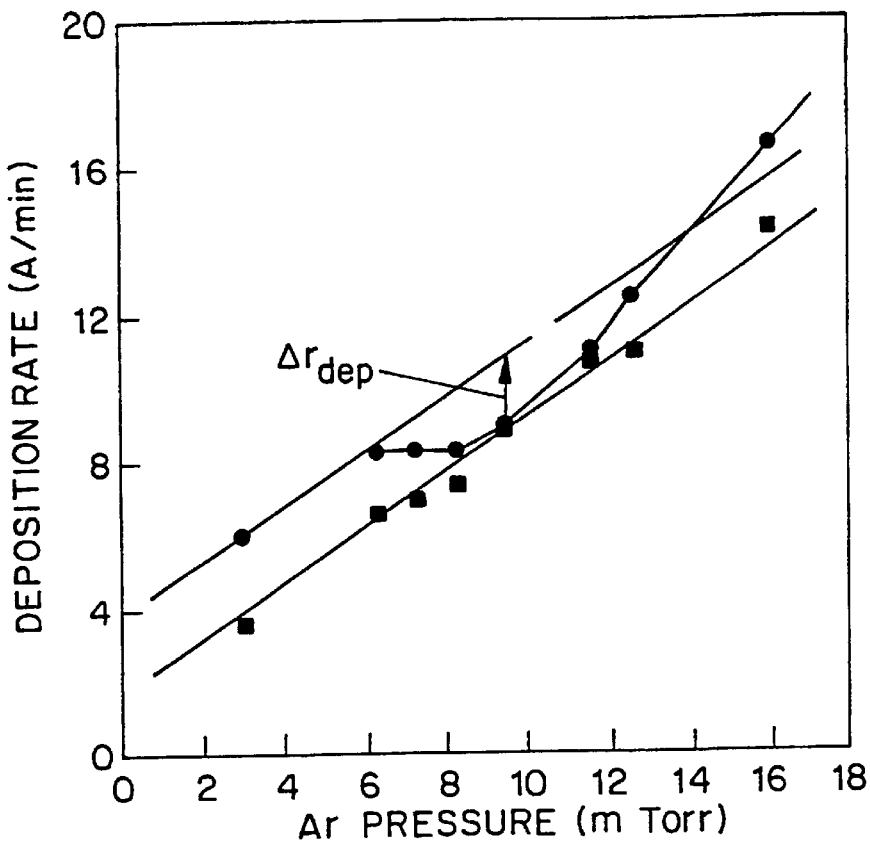
FIG. 8 is a diagram of deposition rate against argon pressure at different substrate distances.

In the present invention using facing target magnetron sputtering (FTMS), the magnetic field can be divergently applied to the plasma in plasma region 20, which induces a high plasma potential as secondary electrons escape to the chamber wall and other grounded parts of the system (refer to FIG. 7B). When amorphous TbCo thin films are deposited in a region of high plasma exposure in FTMS, the deposition rates exhibit unusual changes with Ar pressure. The changes of deposition rate with pressure in the films deposited at different substrate distances from the system center line ($L_s$) are shown in FIG. 8. Circles represent $L_s$=5.4 cm and squares represent $L_s$=6.4 cm. The deposition rate (Angstroms per minute) of the films deposited in the low plasma-exposed region linearly increases with Ar pressure. In the films deposited in a high plasma-exposed region, the changes of deposition rates are not significant in the Ar pressure range from 6 mTorr to 12 mTorr. The difference between the pressure trend line and the observed rate is called $\Delta r_{dep}$.

Figure 9:
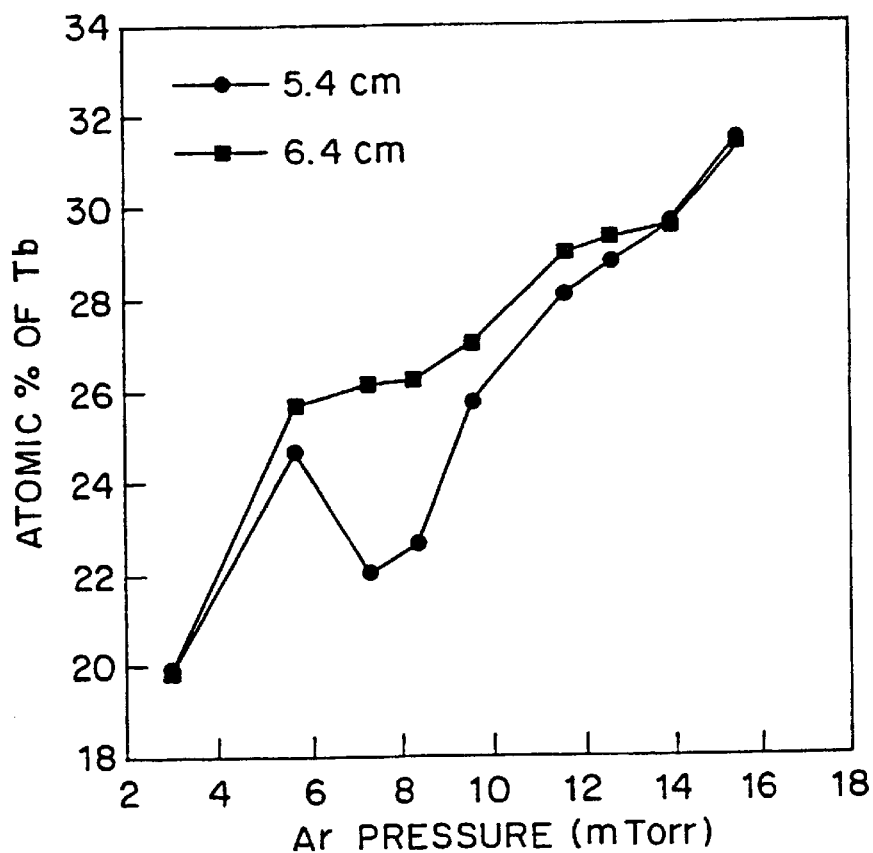
FIG. 9 is a plot of composition vs. argon pressure at different substrate distances.

FIG. 9 shows the film composition changes with Ar pressure at different substrate distances from the system center line ($L_s$). The Tb content of the films deposited in a low plasma-exposed region increases with Ar pressure. On the other hand, the Tb content in the films deposited in a high plasma region suddenly decreases and increases in the Ar pressure range which shows unusual changes of deposition rate. On the basis of quantitative analysis, the unusual changes are due to the preferential resputtering of Tb atoms in amorphous $Tb_xCo_{1-x}$ thin films. A discussion of resputtering can be found in R. J. Gambino & J. J. Cuomo, 15 *J. Vac. Sci. Technol.* 296 (1978). Resputtering refers to the emission of atoms from the material forming on the substrate 18 due to ion bombardment thereof The sputter yield ratio of Tb atoms to Co atoms in the resputtered films were estimated using the model proposed by Harper and Gambino, as described in J. M. E. Harper & R. J. Gambino, *Combined Ion Beam Deposition and Etching for Thin Film Studies*, 16 *J. Vac. Sci. Technol.* 1901 (1979).

The Harper and Gambino model is known to those of skill in the plasma sputtering art. It provides a model for determining the composition of the accumulating film $A_y B_{1-y}$ of two components on a target which is undergoing resputtering. The value of y is determined from the equation:

$$y=[\alpha+(\alpha^2+4x\beta)^{1/2}]2\beta, \tag{2}$$

where:

α is a parameter given by:

$$\alpha=(z+x\epsilon_r-x-\epsilon_r z-1), \tag{3}$$

β is a parameter given by:

$$\beta=(z+\epsilon_r-\epsilon_r z-1), \tag{4}$$

x is the target composition $A_xB_{1-x}$ and z is the fraction resputtered given by:

$$z=(R_A+R_B)/(F_A+F_B) \quad (5)$$

where:

$$R_A=\epsilon_A JY, \quad (6)$$

$$R_B=\epsilon_B J(1-Y), \quad (7)$$

where $\epsilon_A$ is the sputter yield of component A in the film; $\epsilon_B$ is the sputter yield of component B in the film; J is the flux of the etching beam which bombards the substrate on which the film grows (ions/cm²/sec); $F_A$ is the atom flux of component A arriving at the substrate (atoms/cm²/sec); $F_B$ is the atom flux of component B arriving at the substrate; and $\epsilon_r$ is the ratio of sputter yields defined by:

$$\epsilon_r=\epsilon_A/\epsilon_B. \quad (8)$$

The fraction resputtered is strongly dependent on Ar pressure in FTMS with a divergent magnetic field, as seen in FIG. 7B. In order to apply the above-discussed Harper and Gambino model to resputtering effects in FTMS with a composite target, certain modifications must be made. More specifically: the parameter x in equations (2)–(4) must be redefined as film composition without resputtering instead of target composition; and the parameter $\epsilon_r$ used in equations (3) and (4) above and defined in equation (8) must be redefined as the ratio of sputter yields in the resputtered film instead of the ratio of sputter yields. Thus, $\epsilon_r$ in the model for the present invention is defined by:

$$\epsilon_r \epsilon_r^A/\epsilon_r^B, \quad (9)$$

where $\epsilon_r^A$ and $\epsilon_r^B$ are the sputter yields in the resputtered film of components A and B respectively.

Therefore, combining the above equations, the sputter yield ratio, $\epsilon_r$, can be expressed as a function of compositions of the films with and without resputtering (x and y) and fraction resputtered (z):

$$\epsilon_r=\epsilon_r^{Tb}/\epsilon_r^{Co}=[(y+x)(1+x-z)+y^2(z-1)]/[(y+x)(x-z)+y^2(z-1)], \quad (10)$$

where $\epsilon_r^{Tb}$ and $\epsilon_r^{Co}$ are sputter yields of Tb and Co, respectively. The fraction resputtered is obtained from the graph showing the unusual changes of deposition rate with pressure at FIG. 8. The fraction resputtered (z) can be defined as the ratio of the deviation of the deposition rate from an ideal incremental line ($\Delta r_{dep}$) to the ideal deposition rate at a certain pressure ($r_{ideal}$), at which it is assumed that the ideal deposition rate line is parallel to the other deposition rate line without resputtering. The film composition with and without resputtering can be determined from the graphs on Tb contents with Ar pressure at different deposition distances. The values of parameters used to obtain resputter yield ratio using Eq. (9) are shown in Table I below.

TABLE I

| Pressure (mTorr) | 5.6 | 7.3 | 8.3 | 9.6 | 11.6 | 12.6 |
|---|---|---|---|---|---|---|
| Film composition (x) | 0.256 | 0.261 | 0.263 | 0.27 | 0.29 | 0.293 |
| Film composition (y) | 0.246 | 0.22 | 0.226 | 0.257 | 0.281 | 0.288 |
| Fraction resputtered (z) | 0.09 | 0.125 | 0.13 | 0.13 | 0.125 | 0.1 |

Figure 10:
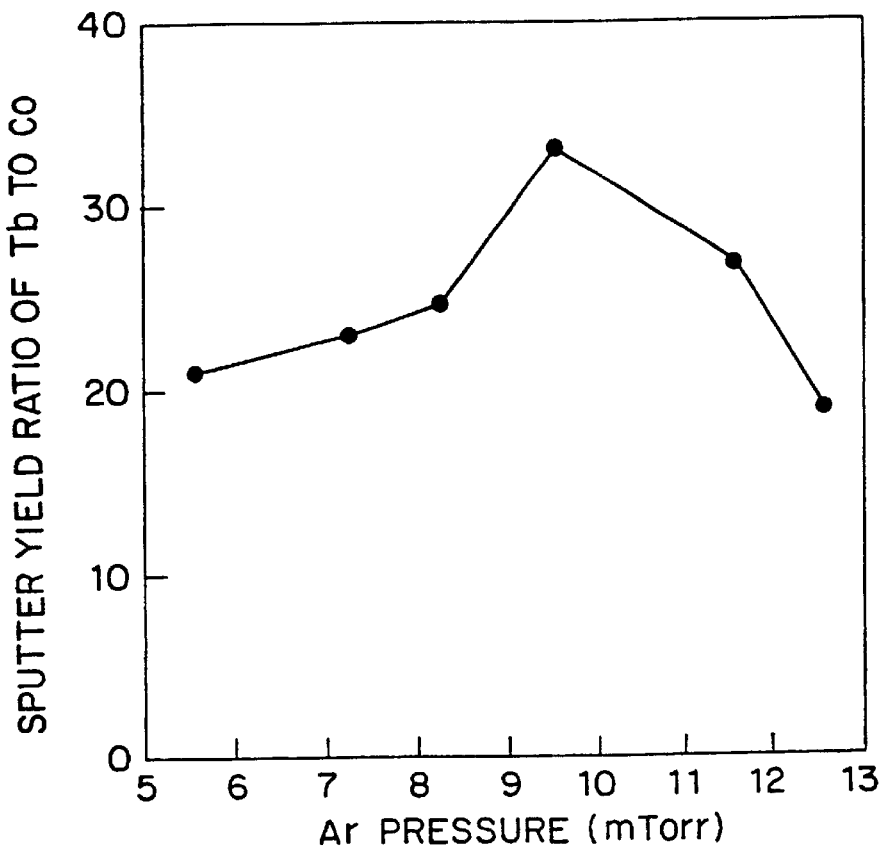
FIG. 10 is a plot of sputter yield ratio of terbium to cobalt against argon pressure.

FIG. 10 exhibits sputter yield ratio of Tb to Co with pressures at which resputtering takes place. The resputter yield ratio of Tb to Co are much higher than 20 in the range of pressure at which resputtering takes place. Therefore, it can be seen that the resputtering effect in amorphous $Tb_xCo_{1-x}$ thin films is mainly caused by Tb atoms. The resputter yield ratio has the largest value at 9.6 mTorr Ar pressure with high plasma potential and high plasma density. Note that, throughout the foregoing, if a ferromagnetic transition metal other than Co or a rare earth element other than Tb were employed, a similar procedure could be used for all calculations, using different superscripts on the variables $\epsilon_r^{Tb}$ and $\epsilon_r^{Co}$, for example.

Figure 11:
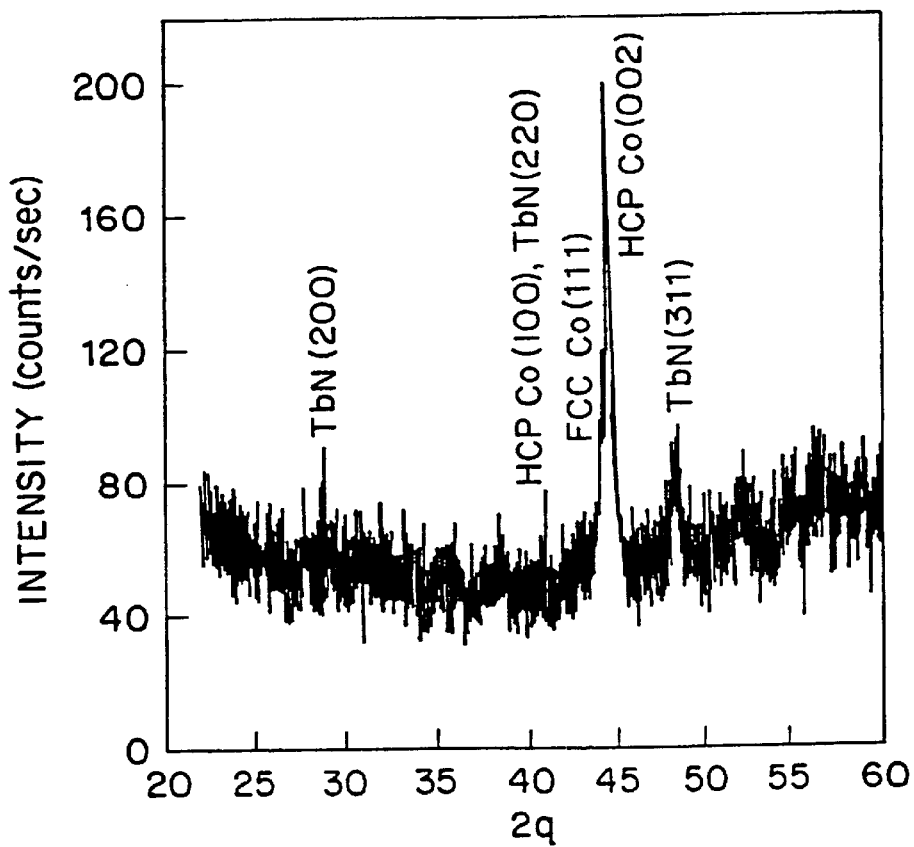
FIG. 11 shows an x-ray diffraction pattern of a TbCo film annealed at 650° C. in a nitrogen gas atmosphere.

FIG. 11 shows the x-ray diffraction pattern of TbCo film annealed at 650° C. in a nitrogen gas atmosphere. Sharp diffraction peaks are observed showing that the material is crystalline, not amorphous. The peaks correspond to diffraction from the (200), (220) and (311) crystal planes of TbN. Several peaks of face centered cubic (fcc) and hexagonal close packed (hcp) cobalt are also observed showing that crystalline cobalt is present. The diffraction peaks of (hcp) cobalt are sharp indicating larger crystallites.

Figure 12:
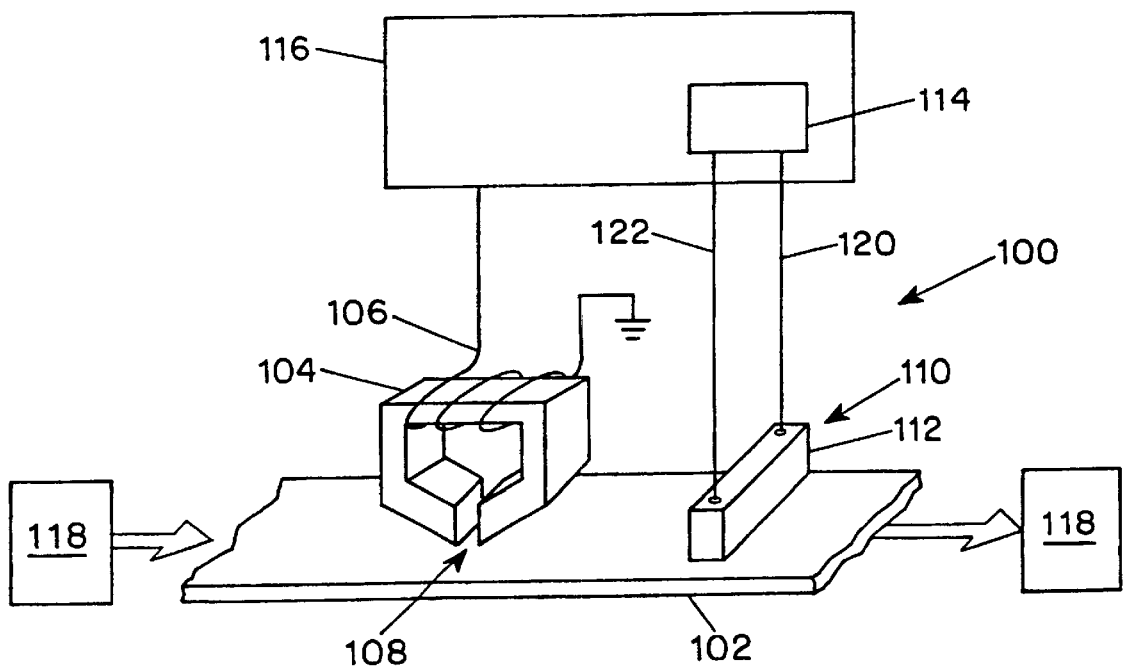
FIG. 12 shows a digital magnetic recording system which employs materials of the present invention.

Reference should now be had to FIG. 12 in connection with a magnetic recording system of the present invention and a method of detecting magnetic field strength according to the present invention. The magnetic field strength can, in some embodiments, correspond to digital information stored in a magnetic recording medium. Analog systems are also possible. As shown in FIG. 12, a magnetic recording system, designated generally as 100, is adapted for use with a magnetic recording medium 102 having a coercive force and adapted to store data (for example, digital data in the form of a plurality of bits (not amenable to illustration)). The bits or other digital or analog data are stored as a magnetization pattern in the medium 102; for example, the magnetization pattern may be stored so as to give rise to a z component of the H field at two different field strengths to represent binary logic levels. Medium 102 is shown as a tape-like element for convenience, but it should be understood that medium 102 could also be a disk element of a disk drive, or the like.

System 100 can include a write head 104 for writing the bits to the medium 102 by producing a magnetic field of N→S or S→N polarity which exceeds the coercive force of the medium 102. Write head 104 can be of a conventional type made of a magnetic material and having a plurality of windings 106 and an air gap 108. In some embodiments of the present invention, the write head 104 can be eliminated when it is desired to use the present invention in a read-only situation, for example, in a playback-only type of video cassette recorder.

System 100 further includes a read head designated generally as 110. Read head 110 includes a portion 112 of a material exhibiting the GMR of any of the types discussed in this application. The portion 112 of magnetoresistive material is located in proximity to the medium 102. Portion 112 is coupled to a resistivity (or resistance) sensor 114 which detects changes in resistivity (or bulk resistance) of the portion 112 corresponding to magnetic field strength levels of the magnetization pattern in the medium 102 associated with the data such as the bits. As discussed above, $\Delta R/R=\Delta\rho/\rho$ so resistivity and resistance are effectively interchangeable with respect to sensor 114. System 100 can further include a controller 116, of which the sensor 114 can be part, which controls the write head 104 and the read head 106 and which converts the detected resistivity/resistance of the portion of GMR material 112 to a signal (for example, a digital signal) which is indicative of the stored data on the medium 102 (for example, stored bits).

System 100 can further include a drive mechanism, depicted schematically by arrows and boxes 118, which causes the medium 102 to move past the read head 110 and the write head 104. It is to be understood that drive mechanism 118 can be any suitable mechanism known in the art and appropriate to the character of the medium 102; for example, a tape drive type mechanism, a disk drive type mechanism, and the like.

It will be appreciated that resistivity/resistance sensor 114 can employ any of a number of well-known techniques to sense the resistivity/resistance of portion 112 of the GMR material. For example, suitable bridge circuits can be employed in order to determine the resistance of the portion 112, and knowing the shape and dimensions of the portion 112, the resistivity can then be determined. As discussed above, the percent change in both quantities is identical for a given geometry. The construction of resistivity/resistance sensor 114 and controller 116 can be similar to those currently employed in prior-art systems utilizing the AMR effect. Typically, in digital applications, a comparator circuit is employed to examine the voltage drop across the portion 112 of GMR material for a suitable clipping level. Appropriate clocking circuitry, as is known in the art, can also be included in controller 116.

It should be noted that digital magnetic recording systems employing the magnetoresistance effect do not need to rely on motion to produce a time-changing magnetic flux as in older systems. Prior-art inductive read heads produce a voltage in the pickup coil which is proportional to the time rate of change of magnetic flux ($d\phi/dt$). Since the z-component of the H field present on magnetic recording medium 102 is sensed directly, system 100 can work with no motion or with slow motion. This would be desirable, for example, in a video cassette recorder wherein it would no longer be necessary to spin the head to produce a large $d\phi/dt$ in order to achieve "freeze-frame." As noted above, read heads according to the present invention can be employed in many different types of devices, including computer disk drives, video cassette recorders, digital and analog audio tape decks, "minidisk" playback systems, magnetic card readers such as credit card readers, and the like. Any type of digital or analog magnetic storage readout can be accomplished. Other applications unrelated to magnetic storage include servo systems such as automatic braking systems for autos, non-destructive testing (detection of eddy currents around defects), and the like.

Still with reference to FIG. 12, a method of detecting magnetic field strength according to the present invention will now be discussed. The magnetic field strength can be that of a magnetic field associated with any medium, for example, the magnetic recording medium 102. One step of the method includes providing a sensing head, such as read head 110 which comprises a portion 112 of a magnetoresistive material exhibiting the GMR. The material can be any of the materials discussed above. The method can also include exposing the sensing head such as read head 110 to the magnetic field of the medium such as magnetic recording medium 102 and sensing electrical resistivity of the portion 112 of the material exposed to the magnetic field. The resistivity varies due to the magnetic field.

It is to be understood that throughout this discussion and the foregoing discussion of the magnetic recording system 100, no explicit value for the resistivity of portion 112 need necessarily be calculated; for example, as discussed above, a voltage drop which depends on the resistivity can be used as a clipping level or threshold without explicit calculation of the resistivity. The method can also include converting the sensed electrical resistivity (or bulk resistance) of the portion 112 to a signal which is indicative of the magnetic strength of the magnetic field (or magnetization pattern) associated with the medium such as magnetic recording medium 102. For example, an analog signal corresponding to the voltage drop across the portion 112 can be processed using the aforementioned comparator circuitry to produce a digital signal which corresponds to the sequence of bits (i.e., 1's and 0's) on magnetic recording medium 102. Instead of a magnetic recording medium 102, the medium could be a material in an auto braking system or a material undergoing non-destructive testing(NDT). The magnetization pattern could be a series of bits but can be, for example, an analog pattern, a pattern for an auto brake system, or a pattern associated with the eddy currents around defects in NDT.

Still with reference FIG. 12, it is to be appreciated that portion 112 can be coupled to resistivity sensor 114 using suitable leads 120, 122. The ends of leads 120, 122 can be located on portion 112 such that there is a defined geometry between the ends of the leads, permitting easy determination of the resistance (and corresponding voltage drop) due to changes in the resistivity. Windings 106 of write head 104 can also be coupled to controller 116 as shown.

EXAMPLE

Amorphous $Tb_xCo_{1-x}$ thin films with the compositions of 25~32 atomic % of Tb were prepared using facing target magnetron sputtering with a composite target. The parameter "x" is the atomic fraction of Tb, ranging from 0.25 to 0.32. The film compositions were controlled by changing the Ar sputtering gas pressure (5~15 mTorr). In order to induce the phase separation of Co and TbN, nitrogen was introduced into amorphous TbCo thin films by annealing at 650° C. for 12 hours with a continuous flow of 10% $H_2$-balance $N_2$ gas mixture. (Annealing at a lower temperature, such as 400° C., would be possible with a longer dwell time). The pressure of the gas mixture in the annealing furnace was about 1 atmosphere and the gas was flowed at a rate of approximately 500 standard cc/minute. The pressure and flow rate of the gas are not critical control parameters. Phase analysis was made with x-ray diffraction (See FIG. 11) and with secondary electron images on a field emission SEM. Magnetization loops were made at room temperature in fields up to 13 kOe using a vibrating sample magnetometer (VSM). The magnetization loops and magnetization vs. temperature with an applied field up to 30 kOe were measured at temperatures from 20 K to 300 K using a SQUID magnetometer. Magnetoresistance at room temperature was measured with applied fields up to 8.5 kOe with a DC electromagnet using Van der Pauw geometry. Electrical contacts were made with fine wires attached using silver paste at the corners of a square sample. The magnetoresistance versus temperature was measured from 20 K to 250 K at 40 kOe in a superconducting coil cryostat. The Hall effect is large before annealing when the alloy is in the amorphous state.

Secondary electron SEM imaging shows that TbN becomes the primary phase and precipitates out of a Co matrix. The TbN forms large (>20 μm) surface patches and small(<0.5 μm) precipitates in the Co matrix. The small precipitates probably segregate to the grain boundaries of the Co matrix. The X-ray diffraction pattern from the film annealed at 650° C. exhibits strong peaks of TbN and the main peaks of the fcc and hcp Co structures which indicates that the Co matrix includes two structures, as seen in FIG. 11. Both the Co and TbN phases are crystalline after the heat treatment, though the crystal structure of the Co is somewhat imperfect, possibly due to beginning with an amorphous material.

Figure 13:
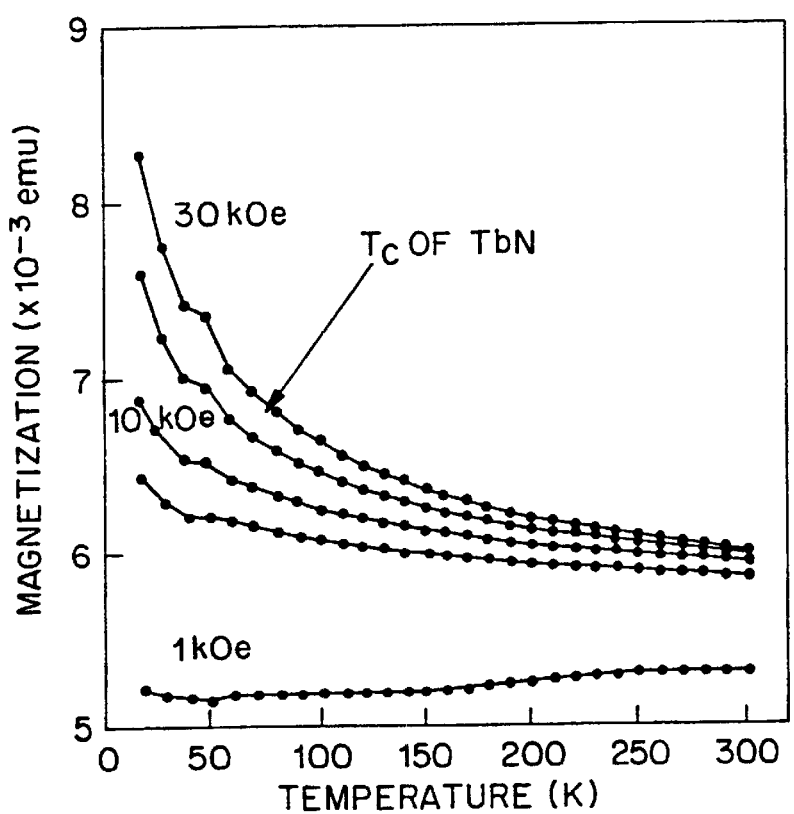
FIG. 13 shows the magnetization of $Co_{0.68}$—$(TbN)_{0.32}$ as a function of temperature at various applied magnetic fields.
Figure 14:
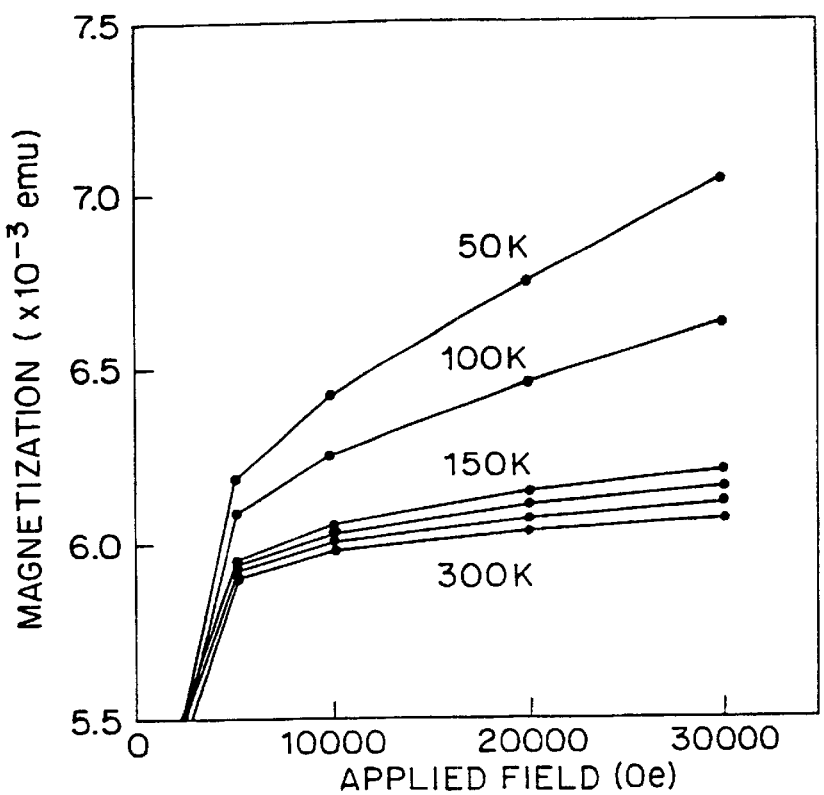
FIG. 14 shows the magnetization of a Co—TbN macroscopic ferrimagnet with applied magnetic field at various temperatures.
Figure 15A:
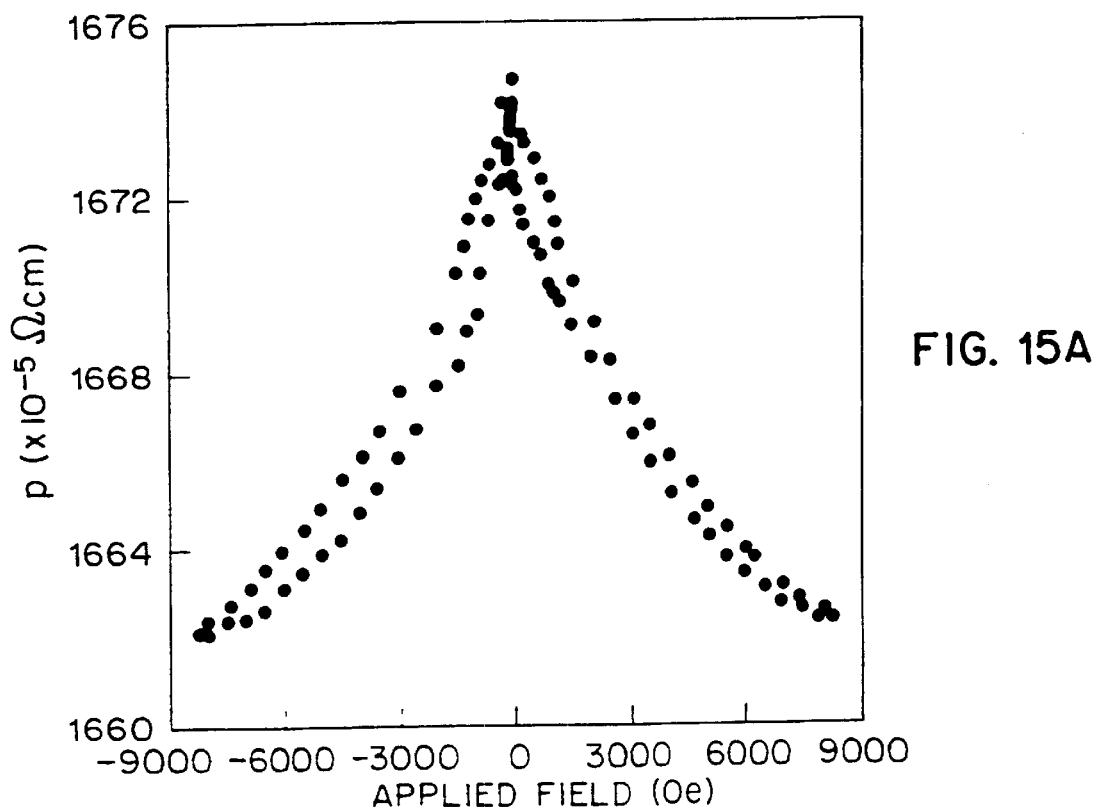
FIG. 15A shows the change in resistivity of a $Co_{0.68}$—$(TbN)_{0.32}$ film as a function of magnetic field at room temperature.
Figure 15B:
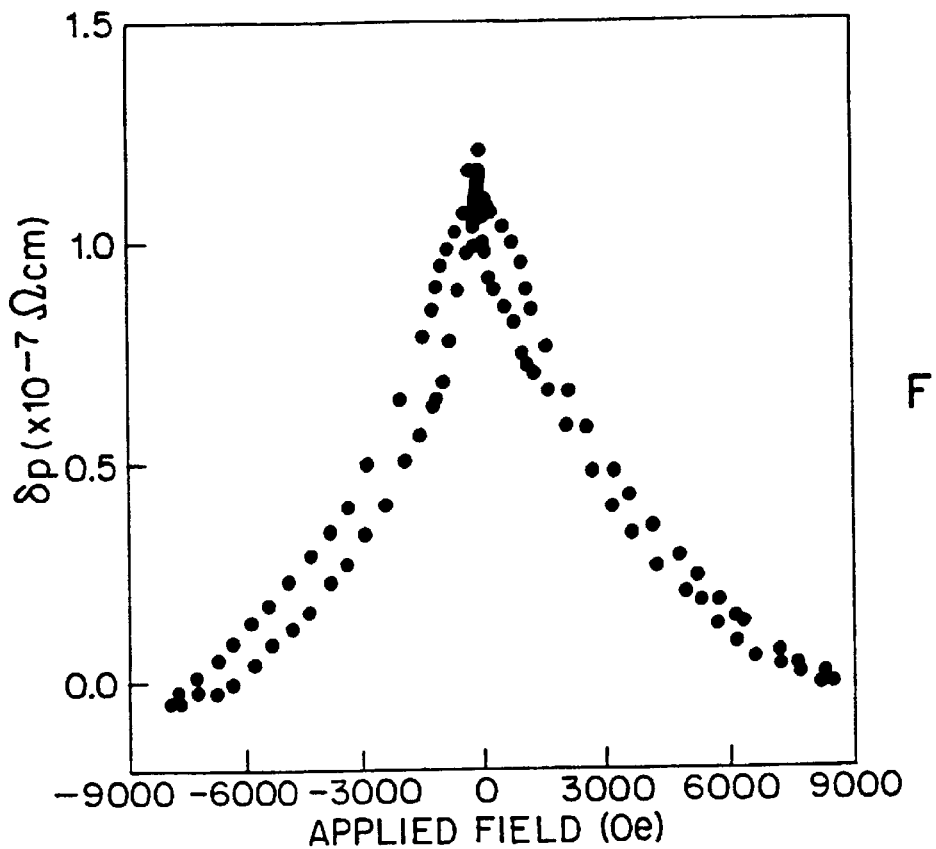
FIG. 15B shows the changes in resistivity for the same film, also as a function of applied magnetic field, at room temperature.

Various features of the magnetic and magnetotransport properties obtained for the Co—TbN with 32% TbN composition are shown in FIGS. 1, 13, 14, 15A and 15B. The MR data are typical of the behavior for all compositions from 25 mole % to 32 mole % TbN. The increase in magnetization with temperature and the broad minimum in magnetization at an applied field of 1 kOe are indications of ferrimagnetic behavior (FIG. 13). The small jump in the magnetization curves at fields of 10, 20 and 30 kOe at 50 K indicate that at these high fields the magnetic moments of the TbN precipitates are ferromagnetically aligned with the Co matrix. The Curie temperature of TbN can be estimated as about 75 K by extrapolating from the break in the magnetization curve at 30 kOe field. FIG. 14 shows the magnetization curves of $Co_{0.68}$—$(TbN)_{0.32}$ film with an applied field at various temperatures. The magnetization is not fully saturated even at the highest applied field of 30 kOe. FIGS. 15A and 15B show the resistivity ($\rho$) and resistivity change ($\delta\rho$) of $Co_{0.68}$—$(TbN)_{0.32}$ as a function of magnetic field at room temperature. The curve shows a cusp-type negative magnetoresistance at room temperature: the decrease of resistivity with increasing applied field. Considering that the electrical properties of the rare-earth nitrides DyN, HoN, and ErN are all metallic, N. Sclar, *J. Appl. Phys.* 1534 (1964), and that the TbN has the same electronic structure as those nitrides, it can be inferred that the TbN precipitate is also an ordinary resistivity metal. The magnetoresistivity ($\delta\rho$) and magnetoresistance ($\delta\rho/\rho$) of $Co_{0.68}$—$(TbN)_{0.32}$ are about $1.12\times10^{-7}$ $\Omega$cm and 0.72% at room temperature up to 8 kOe field, respectively, where the sign of the magnetoresistance is negative (FIG. 1).

The GMR effect of Co—TbN macroscopic ferrimagnets can be described in terms of the scattering of spin polarized conduction electrons by the antiparallel exchange coupled spins at the phase boundary between the TbN precipitates and the Co matrix. R. J. Gambino and J. Wang, supra. In the Co—TbN system the matrix and precipitate are both metallic. The matrix is ferromagnetic and the precipitates are magnetically ordered through the exchange with the Co matrix. In the Co—EuS system, the Co matrix is metallic but the EuS in the particles is a semiconductor. Therefore, the carriers are mainly confined to the Co matrix, which is the main difference between Co—EuS and Co—TbN systems. In the Co—EuS system the conduction electrons are scattered mainly at the Co—EuS interface whereas in the Co—TbN system scattering can occur both at the Co/TbN interface and in the TbN precipitates. That scattering depends on the magnetic alignment of EuS with respect to the cobalt. In the Co—TbN system, when the carriers pass through the phase boundary between the two metallic phases, Co and TbN, they are scattered by the antiparallel exchange coupled spin and the resistivity is high in zero or low fields. In high fields with the Co and TbN ferromagnetically aligned, this spin scattering contribution is expected to disappear.

Figure 16:
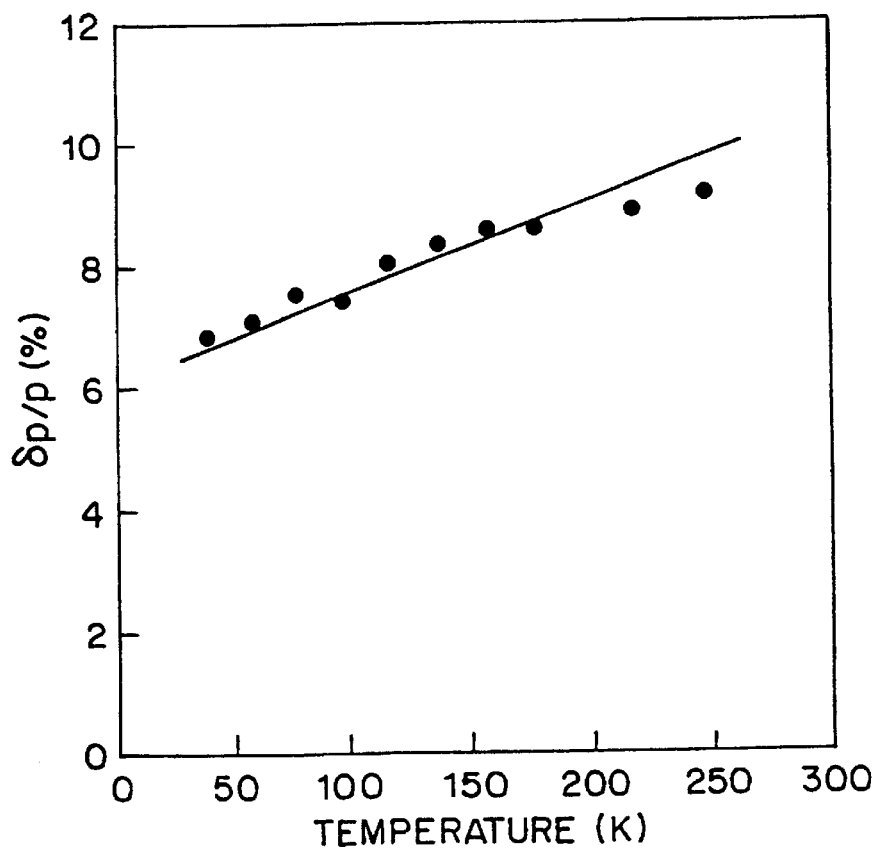
FIG. 16 is a plot of the percent change in resistivity (GMR) of a $Co_{0.68}$—$(TbN)_{0.32}$ film as a function of temperature in a relatively high magnetic field of 40 kOe.

The resistance change of $Co_{0.68}$—$(TbN)_{0.32}$ with temperature at H=0 and 40 kOe displays a behavior typically observed in metals, as shown in FIG. 2. The GMR of $Co_{0.68}$—$(TbN)_{0.32}$ in the high field of 40 kOe is around 9% at 250 K (FIG. 16), which is due to the increase of the ferromagnetic alignment between the Co and TbN by the high field. The GMR of Co—TbN shows an increase with temperature (FIG. 16). These data were obtained from the temperature dependence of resistance shown in FIG. 2. In contrast, ordinary GMR materials have a negative magnetoresistance, where the magnetoresistance decreases with increasing temperature, as described in R.J. Gambino et al., 75 *J. Appl. Phys.* 6909 (1994). Based on the magnetization curve with temperature at an applied field of 1 kOe in FIG. 13, the magnetization decreases with decreasing temperature, which can be explained by the increase of magnetization of the antiparallel exchange coupled TbN phase. The antiparallel exchange coupling between the Co and TbN with different magnetic moments may also become stronger with decreasing temperature. As a result, the ferrimagnetic behavior between the two different magnetic moments increases with decreasing temperature and thus the magnetization decreases.

The magnetization behavior with applied field can be divided by two different regions around 150 K Even though the magnetization curves shown in FIG. 14 are extrapolated to higher fields, the magnetization may not be saturated in a 40 kOe field at temperatures less than 150 K On the other hand, at high temperatures the magnetization approaches saturation in a 40 kOe field. When the temperature increases above 150 K, the antiparallel exchange coupling of the Co and TbN decreases with increasing temperature and the Co and TbN are more easily aligned ferromagnetically in a field. Therefore, the spin scattering contribution is expected to decrease with high applied fields with increasing temperature. Thus the magnetoresistivity, $\delta\rho$, and the GMR, $\delta\rho/\rho$, both increase with increasing temperature.

FIG. 3 shows the dependence of GMR on the volume % of TbN calculated from the composition assuming the normal densities for TbN and Co. The room temperature GMR ($\delta\rho/\rho$) of a $Co_{1-x}$—$(TbN)_x$ system at 8 kOe field increases with the TbN volume fraction. The 32 atomic % TbN composition which corresponds to 39 volume % of TbN has the largest room temperature GMR.

Thus, the new macroscopic ferrimagnet, Co—TbN, including TbN precipitates in a cobalt matrix. has been formed by the transformation of amorphous TbCo to crystalline Co and TbN phases induced by annealing in an $N_2$ gas atmosphere. The fully transformed films annealed at 650° C. demonstrate typical macroscopic ferrimagnetic properties: evidence of negative exchange, magnetic compensation and negative giant magnetoresistance. The antiparallel exchange coupling at the phase boundary between the TbN precipitates and the Co matrix can explain all of these observations. It was found that the TbN magnetization and/or the ferrimagnetic exchange coupling at the phase boundary was increased with decreasing temperature. The temperature dependence of resistivity of the macroscopic ferrimagnet $Co_{0.68}$—$(TbN)_{0.32}$ shows the typical temperature dependence of a metal. The $Co_{0.68}$—$(TbN)_{0.32}$ system has the largest values of $\delta\rho$ and $\delta\rho/\rho$ in the composition range of 25 to 32% TbN. The GMR effect was observed to increase with increasing temperature in the range 30 to 230 K, which was believed to be ascribed to the increase of ferromagnetic alignment of the Co and TbN with a field caused by the weakening of exchange coupling by temperature.

Although the present invention has been described with reference to specific exemplary embodiments, it should be understood that various changes, substitutions and alterations can be made to the disclosed embodiments without departing from the spirit and scope of the invention as defined by the appended claims.

What is claimed is:

1. A magnetoresistive material exhibiting the giant magnetoresistance effect (GMR) and having two phases, said material comprising:

(a) a first phase comprising a matrix of an electrically conductive ferromagnetic transition metal or an alloy thereof; and (b) a second precipitate phase comprising an electrically conductive rare earth pnictide, wherein said electrically conductive rare earth pnictide exhibits ferromagnetic behavior in a precipitated form when precipitated out of said matrix, said second phase being antiferromagnetically exchange coupled to said first phase.

2. The material of claim 1, wherein:
said electrically conductive ferromagnetic transition metal comprises at least one of iron, cobalt and nickel.

3. The material of claim 2, wherein:
said rare earth pnictide comprises a rare earth element compounded with at least one of nitrogen, phosphorous, arsenic, antimony and bismuth.

4. The material of claim 1, wherein said precipitate phase exhibits independent ferromagnetic behavior.

5. The material of claim 1, wherein said precipitate phase does not exhibit independent ferromagnetic behavior but only exhibits ferromagnetic behavior when precipitated out of said matrix.

6. The material of claim 1, wherein:
said matrix comprises cobalt; and
said precipitate phase comprise terbium nitride (TbN) in a volume percent sufficient to produce the GMR in said material without causing discontinuity in said cobalt matrix.

7. The material of claim 6, wherein:
said cobalt matrix has a volume percent of from about 30% to about 75%; and
said terbium nitride precipitate phase has a volume percent of from about 25% to about 70%.

8. The material of claim 6, wherein:
said cobalt matrix has a volume percent of from about 61% to about 70%; and
said terbium nitride precipitate phase has a volume percent of from about 30% to about 39%.

9. A magnetoresistive material exhibiting the giant magnetoresistance effect (GMR) and having two phases, said material comprising:
(a) a first phase comprising a matrix of an electrically conductive ferromagnetic transition metal or an alloy thereof; and
(b) a second precipitate phase comprising an electrically conductive Heusler alloy, wherein said electrically conductive Heusler alloy exhibits ferromagnetic behavior in a precipitated form when precipitated out of said matrix, said second phase being antiferromagnetically exchange coupled to said first phase.

10. The material of claim 9, wherein:
said matrix comprises cobalt; and
said precipitate phase comprises $Co_2MnSn$ in a molar percent sufficient to produce the GMR in said material without causing discontinuity in said cobalt matrix.

11. The material of claim 10, wherein said molar percent of $Co_2MnSn$ ranges from about 16.7 mole % to about 50 mole %.

12. The material of claim 9, wherein:
said matrix comprises cobalt; and
said precipitate phase comprises $Co_2TiSn$ in a molar percent sufficient to produce the GMR in said material without causing discontinuity in said cobalt matrix.

13. The material of claim 12, wherein said molar percent of $Co_2TiSn$ ranges from about 16.7 mole % to about 50 mole %.

14. A method of manufacturing a magnetoresistive material exhibiting the giant magnetoresistance effect (GMR) and having two phases, said method comprising the steps of:

(a) providing a target of an electrically conductive ferromagnetic transition metal or an alloy thereof;
(b) locating a plurality of pellets of an electrically conductive rare earth element on a surface of said target;
(c) sputtering said target and said pellets to cause the deposition on a substrate of an amorphous alloy of said electrically conductive ferromagnetic transition metal or alloy thereof, and said electrically conductive rare earth element; and
(d) annealing said amorphous alloy in an atmosphere containing an element from column VA of the CAS periodic table, or a compound thereof, to cause said element or compound thereof to bond to said rare earth element and form a precipitate phase of a rare earth pnictide within a matrix of said ferromagnetic transition metal or said alloy thereof.

15. The method of claim 14, wherein:
step (a) comprises providing said target as a target of cobalt;
step (b) comprises providing pellets of terbium; and
step (d) comprises annealing in an atmosphere containing nitrogen to form said precipitate phase as a rare earth nitride.

16. The method of claim 15, wherein, in step (c), said sputtering is performed to yield said amorphous alloy with a composition of from about 10 atomic percent to about 50 atomic percent terbium with a balance comprising said cobalt.

17. The method of claim 16, wherein in step (c), said sputtering comprises facing targets magnetron sputtering with an argon plasma.

18. A method of detecting magnetic field strength of a magnetization pattern in a medium, said method comprising the steps of:
(a) providing a sensing head comprising a portion of a magnetoresistive material exhibiting the giant magnetoresistance effect and having two phases, said material in turn comprising:
(a-1) first phase comprising a matrix of an electrically conductive ferromagnetic transition metal or an alloy thereof; and
(a-2) a second precipitate phase comprising an electrically conductive rare earth pnictide, wherein said electrically conductive rare earth pnictide exhibits ferromagnetic behavior in a precipitated form when precipitated out of said matrix, said second phase being antiferromagnetically exchange coupled to said first phase;
(b) exposing said sensing head to the magnetic field of the magnetization pattern in the medium;
(c) sensing electrical resistivity of said portion of said material exposed to the magnetic field of the magnetization pattern in the medium; and
(d) converting said sensed electrical resistivity of said portion to a signal indicative of the magnetization pattern in the medium.

19. A method of detecting magnetic field strength of a magnetization pattern in a medium, said method comprising the steps of:
(a) providing a sensing head comprising a portion of a magnetoresistive material exhibiting the giant magnetoresistive effect and having two phases, said material in turn comprising:
(a-1) a first phase comprising a matrix of an electrically conductive ferromagnetic transition metal or an alloy thereof; and (a-2) a second precipitate phase comprising an electrically conductive Heusler alloy, wherein said electrically conductive Heusler alloy exhibits ferromagnetic behavior in a precipitated form when precipitated out of said matrix, said second phase being antiferromagnetically exchange coupled to said first phase;

(b) exposing said sensing head to the magnetic field of the magnetization pattern in the medium;

(c) sensing electrical resistivity of said portion of said material exposed to the magnetic field of the magnetization pattern in the medium; and (d) converting said sensed electrical resistivity of said portion to a signal indicative of the magnetization pattern in the medium.

20. A magnetic recording system adapted for use with a magnetic recording medium having a coercive force and adapted to store data therein, the data being stored in the form of a magnetization pattern recorded in the medium, said system comprising:

(a) a read head for reading the recorded magnetization pattern in the medium, said read head comprising:
  (a-1) a portion of a magnetoresistive material exhibiting the giant magnetoresistance effect (GMR) and having two phases, said material in turn comprising:
    (a-1a) a first phase comprising a matrix of an electrically conductive ferromagnetic transition metal or an alloy thereof; and
    (a-1b) a second precipitate phase comprising an electrically conductive rare earth pnictide, wherein said electrically conductive rare earth pnictide exhibits ferromagnetic behavior in a precipitated form when precipitated out of said matrix, said second phase being antiferromagnetically exchange coupled to said first phase, said magnetoresistive material being located in proximity to the medium; and
  (a-2) a resistivity sensor which detects resistivity of said portion corresponding to magnetic field strength levels adjacent the medium associated with the recorded magnetization pattern; and (b) a controller which controls said read head and which converts said detected resistivity of said portion to a signal indicative of the stored data in the medium.

21. The system of claim 20, further comprising a drive mechanism which causes the medium to move past said read head.

22. The system of claim 21, further comprising a write head for writing the data to the medium by producing a magnetic field of N→S or S→N polarity exceeding the coercive force of the magnetic medium so as to record the magnetization pattern therein, wherein said drive medium also causes the medium to move past said write head.

23. The system of claim 20, wherein said data is digital data comprising a plurality of bits and said controller provides a digital signal indicative of the stored bits in the medium.

24. A magnetic recording system adapted for use with a magnetic recording medium having a coercive force and adapted to store data therein, the data being stored in the form of a magnetization pattern in the medium, said system comprising:

(a) a read head for sensing the magnetization pattern recorded in the medium, said read head comprising:
  (a-1) a portion of a magnetoresistive material exhibiting the giant magnetoresistance effect (GMR) and having two phases, said material comprising:
    (a-1a) a first phase comprising a matrix of an electrically conductive ferromagnetic transition metal or an alloy thereof; and
    (a-1b) a second precipitate phase comprising an electrically conductive Heusler alloy, wherein said electrically conductive Heusler alloy exhibits ferromagnetic behavior in a precipitated form when precipitated out of said matrix, said second phase being antiferromagnetically exchange coupled to said first phase, said magnetoresistive material being located in proximity to the medium; and
  (a-2) a resistivity sensor which detects resistivity of said portion corresponding to magnetic field strength levels adjacent the medium associated with the recorded magnetization pattern; and (b) a controller which controls said write head and said read head and which converts said detected resistivity of said portion to a signal indicative of the stored data in the medium.

25. The system of claim 24, further comprising a drive mechanism which causes the medium to move past said read head.

26. The system of claim 25, further comprising a write head for writing the data to the medium by producing a magnetic field of N→S or S→N polarity exceeding the coercive force of the magnetic medium so as to record the magnetization pattern therein, wherein said drive medium also causes the medium to move past said write head.

27. The system of claim 24, wherein said data is digital data comprising a plurality of bits and said controller provides a digital signal indicative of the stored bits in the medium.

28. A method of manufacturing a magnetoresistive material exhibiting the giant magnetoresistance effect (GMR) and having two phases, said method comprising the steps of:

(a) providing a target of an electrically conductive ferromagnetic transition metal or an alloy thereof;

(b) locating a plurality of pellets of Heusler alloy components on a surface of said target;

(c) sputtering said target and said pellets to cause the deposition on a substrate of an amorphous alloy of said electrically conductive ferromagnetic transition metal or alloy thereof, and said Heusler alloy components; and (d) annealing said amorphous alloy to cause formation of a precipitate phase of a Heusler alloy within a matrix of said ferromagnetic transition metal or said alloy thereof.

29. The method of claim 28, wherein:

step (a) comprises providing said target as a target of cobalt; and step (b) comprises providing pellets of Mn and Sn.

30. The method of claim 29, wherein in step (c), said sputtering comprises facing targets magnetron sputtering with an argon plasma.

31. The method of claim 28, wherein:

step (a) comprises providing said target as a target of cobalt; and step (b) comprises proving pellets of Ti and Sn.

32. The method of claim 31, wherein in step (c), said sputtering comprises facing targets magnetron sputtering with an argon plasma.

* * * * *

UNITED STATES PATENT AND TRADEMARK OFFICE
CERTIFICATE OF CORRECTION

PATENT NO. : 6,375,761 B1
DATED : April 23, 2002
INVENTOR(S) : Gambino et al.

It is certified that error appears in the above-identified patent and that said Letters Patent is hereby corrected as shown below:

Column 5,
Line 46, "a" should read -- an --

Column 6,
Line 29, "cross sectional" should read -- cross-sectional --

Column 7,
Line 11, "kilogaus." should read -- kilogauss. --
Line 44, "pellets 14" should read -- pellets 12 --
Line 52, "performed. Using" should read -- performed using --

Column 8,
Line 47, "MHZ," should read -- MHz, --

Column 10,
Equation (2): "$y=[\alpha+(\alpha^2+4x\beta)^{1/2}]2\beta$" should read -- $y=[\alpha+(\alpha^2+4x\beta)^{1/2}]/2\beta$ --

Column 11,
Equation (9): "$\epsilon_r\epsilon_r^A/\epsilon_r^B,$" should read -- $\epsilon_r=\epsilon_r^A/\epsilon_r^B,$ --

Signed and Sealed this

Tenth Day of June, 2003

JAMES E. ROGAN
*Director of the United States Patent and Trademark Office*